US011327846B2

(12) United States Patent
Kumar et al.

(10) Patent No.: US 11,327,846 B2
(45) Date of Patent: May 10, 2022

(54) SYSTEM AND METHOD FOR BACKUP AND RECOVERY OF SERVICES IN A CLOUD COMPUTING ENVIRONMENT

(71) Applicant: ORACLE INTERNATIONAL CORPORATION, Redwood Shores, CA (US)

(72) Inventors: Amod Kumar, Noida (IN); Prashant Shishir, Redwood City, CA (US); Tim Lake, San Francisco, CA (US); Marina Vatkina, Santa Clara, CA (US); Daniel Guo, Santa Clara, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 16/144,488

(22) Filed: Sep. 27, 2018

(65) Prior Publication Data

US 2019/0095289 A1  Mar. 28, 2019

Related U.S. Application Data

(60) Provisional application No. 62/564,678, filed on Sep. 28, 2017.

(51) Int. Cl.
*G06F 16/11* (2019.01)
*G06F 11/14* (2006.01)

(52) U.S. Cl.
CPC ...... *G06F 11/1464* (2013.01); *G06F 11/1435* (2013.01); *G06F 11/1451* (2013.01);
(Continued)

(58) Field of Classification Search
CPC .................................................. G06F 16/113
See application file for complete search history.

(56) References Cited

U.S. PATENT DOCUMENTS 8,868,509 B2  10/2014 Li
8,930,320 B2  1/2015 Tung et al.
(Continued)

OTHER PUBLICATIONS

Debian 9 Stretch released Jun. 17, 17, debian.org, https://www.debian.org/News/2017/20170617.*
(Continued)

*Primary Examiner* — Jason G Liao
(74) *Attorney, Agent, or Firm* — Tucker Ellis LLP

(57) ABSTRACT

In accordance with various embodiments, described herein are systems and methods for enabling backup and recovery of cloud services (services) in a cloud computing environment (cloud environment). The techniques described herein can be used, for example, to facilitate restoration of a service that may have been originally provisioned as part of a user system/environment, within the cloud environment, and was subsequently lost due to accident deletion of the service, or cloud account termination. A service archive, created during a backup process, includes an archive file that contains the artifacts that were installed and/or created when the service was provisioned; and a metadata file that contains the current state information for the service when the backup was performed. During a recovery process, a lost service can be provisioned within the user system/environment, using the contents of the service archive, irrespective of whether the service itself still exists within the user system/environment.

15 Claims, 21 Drawing Sheets

(52) U.S. Cl.
CPC ...... *G06F 11/1461* (2013.01); *G06F 11/1469* (2013.01); *G06F 11/1471* (2013.01); *G06F 11/1482* (2013.01); *G06F 16/113* (2019.01); *G06F 2201/80* (2013.01)

(56) References Cited

U.S. PATENT DOCUMENTS

| | | |
|---|---|---|
| 9,122,711 B1 | 9/2015 | Nicolini et al. |
| 9,501,365 B2 | 11/2016 | Parab |
| 9,558,076 B2 | 1/2017 | Durge et al. |
| 9,652,329 B2 | 5/2017 | Prasad et al. |
| 2012/0303583 A1 | 11/2012 | Chowdhry |
| 2016/0212207 A1 | 7/2016 | Guo et al. |

OTHER PUBLICATIONS

Release Notes for Debian 7.0 (wheezy), 32-bit PC, Chapter 2, [date unknown; captured on May 20, 2020], debian.org, https://www.debian.org/releases/wheezy/i386/release-notes/ch-whats-new.en.html#cloud.*
Tune2fs(8)—Linux man page [date unknown; captured on Aug. 19, 2016 by archive.org], die.net, https://web.archive.org/web/20160819093212/http://linux.die.net/man/8/tune2fs.*
Grohne et al., Re: e2fsprogs as Essential: yes?, debian.org, https://lists.debian.org/debian-devel/2017/09/msg00449.html.*
The kernel development community, ext4 Data Structures and Algorithms [date unknown, captured May 20, 2020], kernel.org, https://www.kernel.org/doc/html/latest/filesystems/ext4/globals.html#journal-jbd2.*
APPNOTE.TXT—.ZIP File Format Specification Oct. 1, 2014, PKWARE Inc., Version 6.3.4, https://pkware.cachefly.net/webdocs/APPNOTE/APPNOTE-6.3.4.TXT.*
Package: zip (1.0-11 and others) date unknown, debian.org, https://packages.debian.org/stretch/zip.*
Package: bash (4.4-5) date unknown, debian.org, https://packages.debian.org/stretch/bash.*
Maruthamuthu, How to Use Tar Command Effectively in Linux For Good Backup Solution Apr. 14, 2019, 2daygeek.com, https://www.2daygeek.com/linux-tar-compress-decompress-extract-archive-files-folders/.*
Lehtonen, Debian GNU/Linux System Administrator's Manual Chapter 12—Backup and Restore Feb. 17, 2009, debian.https://web.archive.org/web/20090217160118/https://www.debian.org/doc/manuals/system-administrator/ch-sysadmin-backup.html.*
Tarsnap, Aug. 26, 2016, github.org, https://github.com/Tarsnap/tarsnap/tree/964bec4059037701c6630368ea18c8fe5c7d445b/tar.*
Tarsnap, Online backups for the truly paranoid date unknown [captured on Aug. 19, 2016 by archive.org, https://web.archive.org/web/20160819190950/http://www.tarsnap.com/index.html.*
Tarsnap, Online backups for the truly paranoid date unknown [captured on Aug. 12, 2016 by archive.org, https://web.archive.org/web/20160812042644/http://www.tarsnap.com/infrastructure.html.*
Tarsnap, Online backups for the truly paranoid date unknown [captured on Jul. 30, 2016 by archive.org, https://web.archive.org/web/20160730182655/http://www.tarsnap.com/faq.html.*
Merilainen, Simple backup system for Linux with Bash, Tar, Rsunc, and Crontab p. 1/2, tuukkamerilainen.com.*
Debian on CDs, date unknown [captured by archive.org on Jul. 17, 2017], https://web.archive.org/web/20170717080915/https://www.debian.org/CD/.*
Persistent store definiton Jun. 4, 2021, Google, https://www.google.com/search?q=persistent+store+definition&ei=uWa6YJKAIo2q5NoPwpac-As&oq=persistent+store+definition&gs_lcp=Cgdnd3Mtd2l6EAMyBQghEKABOgUIABCRAjoFCAAQsQM6CwguELEDEMcBEKMCOgglLhCxAxCDATOECAAQQzoECC4QQzolCC4QxwEQowl6CAgAELEDEIMBOgllADoFCC4QsQM6CAguELEDEJMCO.*
Martin et al., Where is .bashrc file found in Linux? Jun. 24, 2015, StackExchange, https://unix.stackexchange.com/questions/211713/where-is-bashrc-file-found-in-linux.*
Sweetfa et al., How to set up the DOMAIN_HOME environment variable in SUSE Linux Sep. 13, 2011, StackExchange, https://unix.stackexchange.com/questions/20604/how-to-set-up-the-domain-home-environment-variable-in-suse-linux.*
Soban, How To Use Nginx as a Global Traffic Director on Debian or Ubuntu May 30, 2014, https://www.digitalocean.com/community/tutorials/how-to-use-nginx-as-a-global-traffic-director-on-debian-or-ubuntu.*
Smith et al., GDISK(8) Nov. 22, 2015, debian.org, https://manpages.debian.org/stretch/gdisk/gdisk.8.en.html.*
File list of package cloud-init in stretch of architecture all [date unknown; captured on Jun. 5, 2021], debian.org https://packages.debian.org/stretch/all/cloud-init/filelist.*
Virtual Package: httpd [date unknown; captured on Jun. 5, 2021], debian.org, https://packages.debian.org/stretch/httpd.*
"Backing up cloud-native applications: Practice overview—Practice—IBM Cloud Garage Method", retrieved on Jan. 8, 2018 from https://www.IBM.com/cloud/garage/content/manage/backup-cloudnative/, 8 pages.
"BOSH Backup and Restore—Cloud Foundry Docs", retrieved on Jan. 8, 2018 from https://docs.cloudfoundry.org/bbr/index.html, 4 pages.

\* cited by examiner

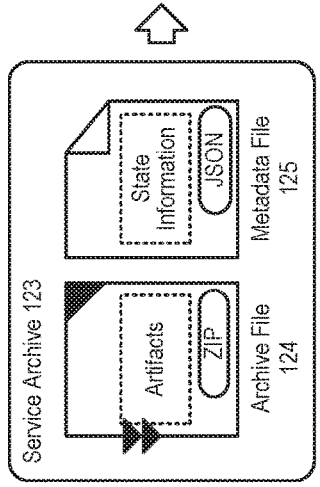

(Second) Component (e.g., OTD) State Information 456

```
"OTD":{
  "componentType":"OTD",
  "attributes":{
    "SECURE_LISTENER_PORT":"8081",
    "serverCounter":"0",
    "ADMIN_USER":"weblogic",
    "LISTENER_PORT_ENABLED":"false",
    "SECURED_LISTENER_PORT":"8081",
    "ADMIN_PORT":"8089",
    "SERVICE_SECURED_LISTENER_PORT":"443",
    "PRIV_LISTENER_PORT":"80",
    "OTD_SERVER_SEC_LIST":"/OPCWLaaS/paas/JaaS/ora_otd",
    "PRIVILEGED_SECURED_LISTENER_PORT":"443",
    "SERVICE_LISTENER_PORT:"80",
    "SHAPE":"oc3",
    "PRIV_SECURE_LISTENER_PORT":"443",
    "OTD_CONFIG_NAME":"opc-config",
    "POLICY":"LEAST_CONNECTION_COUNT",
    "PRIVILEGED_LISTENER_PORT":"80",
    "ADMIN_HOST_SEC_LIST":"/OPCWLaaS/paas/JaaS/ora_otd_infraadmin",
    ...
```

Archive File (e.g., Archive.zip) Information 458

```
"BACKUP_INFO":{
  "isEncrypted": true,
  "backupURL": "https://F_15fcdd4a-cc8f/archive.zip
}
```

(Example) Metadata File 450

Interactive Cloud Tool — 102

[Cancel]                Service — Details — Confirm                [Next >]

Service
Provide basic service instance information.

* Service Name        [                    ] ⓘ        * Service Level      [Oracle Java Cloud Service ▾] ⓘ
  Description         [                    ] ⓘ        * Software Release   [Oracle WebLogic Server 12c, ▾] ⓘ
  Notification Email  [<enter your email addresss>] ⓘ  * Software Edition   [Enterprise Edition ▾] ⓘ
                                                      * Metering Frequency [Monthly ▾] ⓘ

User Interface 104

*FIGURE 16*

Interactive Cloud Tool

Provide details for this Oracle Java Cloud Service Instance

[Simple] [Advanced]

Weblogic Configuration

*Compute Shape: OC3 - 1.0 OCPU, 7.5GB RAM ⓘ

*SSH Public Key: [Edit] ⓘ

*Cluster Size: 1

Weblogic Access

*Source Service Administrative Username: weblogic ⓘ

*Source Service Password: ⓘ

*Confirm Source Service Password: ⓘ

☑ Selection Summary

*Database Instance Name: <Select an instance> ⓘ

Load Balancer

*Provision Load Balancer: Yes ⓘ

Compute Shape: OC3 - 1.0 OCPU, 7.54GB RAM ⓘ

Add Another Active OTD Node: ☐ ⓘ

Load Balancer Policy: Least Connection Count ⓘ

Backup and Recovery Configuration

*Backup Destination: Both Remote and Disk Storage ⓘ

*Cloud Storage Container: ⓘ

*Username: ⓘ

*Password: ⓘ

Create Cloud Storage Container: ☐ ⓘ

User Interface 104

Interactive Cloud Tool ─ 102

Oracle Java Cloud Service
Create Service

◀ Previous | Cancel

○──○──● 
Service  Details  Confirm

Create ▶

Confirmation
Confirm your selections and create your service.

Service
Service Name: asdfsafsdfsdf
Description: asdfsafsdfsdf
Service Level: Oracle Java Cloud Service
Software Release: Oracle WebLogic Server 12c,...
Software Edition: Enterprise Edition
Metering Frequency: Monthly

Weblogic Configuration
Compute Shape: OC3 - 1.0 OCPU, 7.5GB RAM
SSH Public Key: ssh-rsa AAAAB3NzaC1yc2EAAAA...
Cluster Size: 1
Domain Partitions: 0
Weblogic Access

Database Details
Database Instance Name: dbSourceServiceForDemo2
Administrator Username: sys
PDB Name: PDB1

Load Balancer Configuration
Provision Load Balancer: No

Backup and Recovery Configuration
Backup Destination: Both Remote and Disk Storage
Cloud Storage Container: Storage-StorageEval01dg/Jaa...
Username: StorageEval01dg.Storageadmin User Interface 104

*FIGURE 19*

Interactive Cloud Tool

Oracle Java Cloud Service / testOTD

As of Sep 1, 2017 3:12:42 PM UTC

Overview

Node: 1

Service Overview

| Nodes | OCPUs | Memory | Storage |
|---|---|---|---|
| 1 | 1 | 7.5 GB | 77 GB |

Status: Ready
Backup Destination: Both Remote and Disk Storage
JDK: 1.8.0_144
Version: 12.2.1.2.170718
Cloud Storage Container: Storage-StorageEval01dg/JaaSBackup
Open Sample Application: https://10.241.226.174/sample-app
Provision from a backup: true

Resources

Host Name: testotd-wls-1
Public IP: 10.241.226.174
Instance: Runs PFBSourc_server_1
OCPUs: 1
Memory: 7.5 GB
Storage: 77 GB

Associations (1)

Service Name: dbSourceServiceForDemo2
Oracle Database Cloud
Service Type: Service
Type: Depends On
Status: Ready

Administration

0
Patches available
Aug 31, 2017 9:45:00 PM UTC
Last Successful Backup

User Interface 104

*FIGURE 20*

SYSTEM AND METHOD FOR BACKUP AND RECOVERY OF SERVICES IN A CLOUD COMPUTING ENVIRONMENT

CLAIM OF PRIORITY

This application claims the benefit of priority to U.S. Provisional Application titled "SYSTEM AND METHOD FOR BACKUP AND RECOVERY OF SERVICES IN A CLOUD COMPUTING ENVIRONMENT", Application No. 62/564,678, filed Sep. 28, 2017, which application is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to cloud computing environments, and to systems and methods for enabling backup and recovery of cloud services, to facilitate restoration of a service that may have been lost due to accident deletion of the service, or cloud account termination.

BACKGROUND

A cloud computing environment can facilitate the provisioning of cloud services, without requiring a consumer of such services to incur the complexity and cost of buying and managing the underlying computer hardware or software. One or more services can be provisioned as an integrated user system/environment that includes features such as networks, servers, storage, tools, or libraries, which a user/consumer can then configure for their own use.

For example, an Oracle cloud environment enables provisioning of one or more Platform as a Service (PaaS) services, non-limiting examples of which may include a Java cloud service, database cloud service, storage cloud service, or compute cloud service, each of which provides various functionalities, to address various use cases.

Such cloud environments generally allow the user/consumer to create their user system/environment by provisioning one or more services, and indicating configuration settings for each service being provisioned. However, as their user system/environment grows or increases in complexity, the management of the system becomes increasingly complex. In the event a problem occurs with the configuration settings for a particular service, reverting the user system/environment to a prior stable state can be challenging. In particular, if a service is lost, for example due to accident deletion of the service, or cloud account termination, it may be difficult to recover the lost service, and recreate the user system/environment.

SUMMARY

In accordance with various embodiments, described herein are systems and methods for enabling backup and recovery of cloud services (services) in a cloud computing environment (cloud environment). The techniques described herein can be used, for example, to facilitate restoration of a service that may have been originally provisioned as part of a user system/environment, within the cloud environment, and was subsequently lost due to accident deletion of the service, or cloud account termination. A service archive, created during a backup process, includes an archive file that contains the artifacts that were installed and/or created when the service was provisioned; and a metadata file that contains the current state information for the service when the backup was performed. During a recovery process, a lost service can be provisioned within the user system/environment, using the contents of the service archive, irrespective of whether the service itself still exists within the user system/environment.

BRIEF DESCRIPTION OF THE DRAWINGS

FIG. 8B further illustrates an example of a metadata file, in accordance with an embodiment.

FIG. 13 further illustrates a graphical user interface, in accordance with an embodiment.

FIG. 14 further illustrates a graphical user interface, in accordance with an embodiment.

FIG. 15 further illustrates a graphical user interface, in accordance with an embodiment.

FIG. 16 further illustrates a graphical user interface, in accordance with an embodiment.

FIG. 17 further illustrates a graphical user interface, in accordance with an embodiment.

FIG. 18 further illustrates a graphical user interface, in accordance with an embodiment.

FIG. 19 further illustrates a graphical user interface, in accordance with an embodiment.

FIG. 20 further illustrates a graphical user interface, in accordance with an embodiment.

DETAILED DESCRIPTION

As described above, a cloud computing environment can facilitate the provisioning of cloud services, without requiring a consumer of such services to incur the complexity and cost of buying and managing the underlying computer hardware or software. One or more services can be provisioned as an integrated user system/environment that includes features such as networks, servers, storage, tools, or libraries, which a user/consumer can then configure for their own use.

For example, an Oracle cloud environment enables provisioning of one or more Platform as a Service (PaaS) services, non-limiting examples of which may include a Java cloud service, database cloud service, storage cloud service, or compute cloud service, each of which provides various functionalities, to address various use cases.

Such cloud environments generally allow a user/consumer to create their user system/environment by provisioning one or more services, and indicating configuration settings for each service being provisioned. However, as their user system/environment grows or increases in complexity, the management of the system becomes increasingly complex. In the event a problem occurs with the configuration settings for a particular service, reverting the user system/environment to a prior stable state can be challenging. In particular, if a service is lost, for example due to accident deletion of the service, or cloud account termination, it may be difficult to recover the lost service, and recreate the user system/environment.

In accordance with various embodiments, described herein are systems and methods for enabling backup and recovery of cloud services (services) in a cloud computing environment (cloud environment). The techniques described herein can be used, for example, to facilitate restoration of a service that may have been originally provisioned as part of a user system/environment, within the cloud environment, and was subsequently lost due to accident deletion of the service, or cloud account termination. A service archive, created during a backup process, includes an archive file that contains the artifacts that were installed and/or created when the service was provisioned; and a metadata file that contains the current state information for the service when the backup was performed. During a recovery process, a lost service can be provisioned within the user system/environment, using the contents of the service archive, irrespective of whether the service itself still exists within the user system/environment.

For example, in accordance with an embodiment, the system can provide a backup service that performs a backup of the user configuration settings, artifacts, metadata, and runtime/historical data associated with a particular service; and an interactive cloud tool that, should the particular service be lost, enables recovery by a user of that lost service.

Figure 1:
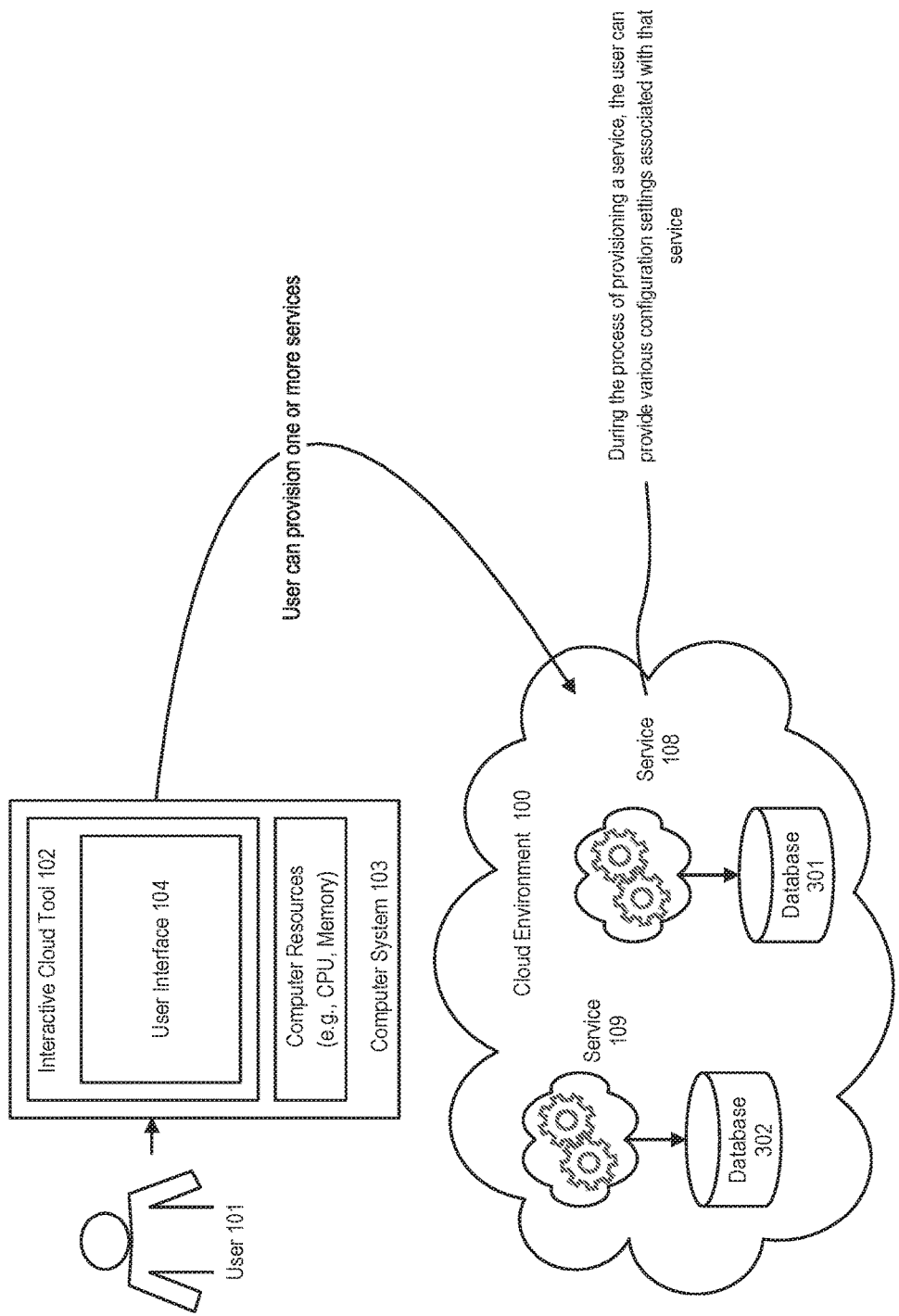
FIG. 1 illustrates provisioning of one or more services, in a cloud environment, in accordance with an embodiment.

FIG. 1 illustrates provisioning of one or more services, in a cloud environment, accordance with an embodiment.

As illustrated in FIG. 1, in accordance with an embodiment, a cloud computing environment (cloud environment), for example an Oracle cloud environment, can be accessed via an interactive software application or cloud tool 102, that can be provided as software or program code executable by a computer system or other processing device, and include, for example, a user interface 104, command-line interface, or application program interface (API), operating at a computer system 103 including one or more microprocessors (CPU), memory and/or computer readable storage media, which enables provisioning by a user 101 of one or more cloud services (services) 108, 109, such as, for example, a Java cloud service, database cloud service, storage cloud service, compute cloud service, or other type of service provided at the cloud environment.

In the illustrated example, each of the one or more services can also be associated respectively with databases 301, 302, for use with those services.

In accordance with an embodiment, during the process of provisioning a particular service as part of a user system/environment, the user can provide various configuration settings associated with that service, for use in executing the service within the cloud environment. Configuration settings that may be required for subsequent backup and/or recovery of the service, for example a backup location, or security credentials, can also be provided at this stage.

Subsequent to provisioning of the service, the provisioned service together with those artifacts that were installed and/or created for use with that service are considered candidates for backup.

Service Backup Process

Figure 2:
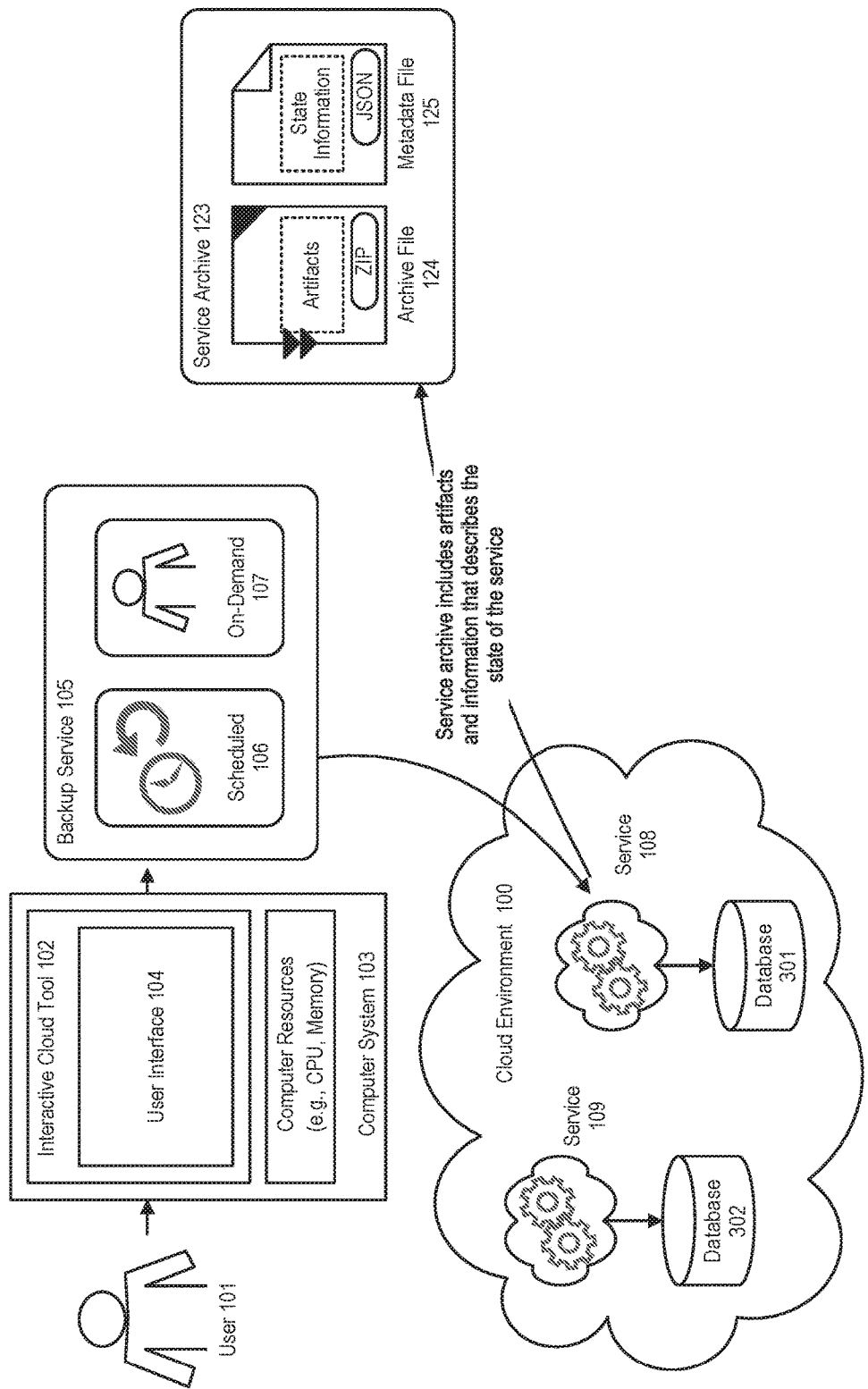
FIG. 2 illustrates the creation of a service archive using a backup service, in accordance with an embodiment.

FIG. 2 illustrates the creation of a service archive using a backup service, in accordance with an embodiment.

As illustrated in FIG. 2, in accordance with an embodiment, the system can provide a backup service 105 that can perform either a scheduled backup 106, or an on-demand 107 backup, of a particular service (for example, service 108), optionally together with an associated database (for example, database 301). Example usages of a backup service with a PaaS cloud service implementation, and Java cloud service recovery are provided below, for purposes of illustration.

In accordance with an embodiment, the backup process performed by the backup service includes, for a particular service, creating a service archive 123 that includes an archive file 124 (e.g., an archive.zip file), and a metadata file 125 (e.g., a Meta.json file).

In accordance with an embodiment, the archive file contains the artifacts that were installed and/or created when the service was provisioned; while the metadata file contains the current state information for the service when the backup was performed. These artifacts and state information can be used by the system when the user wants to provision an instance of the lost service.

For example, in accordance with an embodiment, the archive file can contain the runtime artifacts required to restore a service instance's configuration data. For example, the archive file may contain a domain configuration of a service instance, including the $DOMAIN_HOME volume of each virtual machine (/u01/data/domains); managed server persistent stores used for transaction logs or JMS providers; a traffic director configuration for use with a load balancer; or other types of artifacts.

Figure 3:
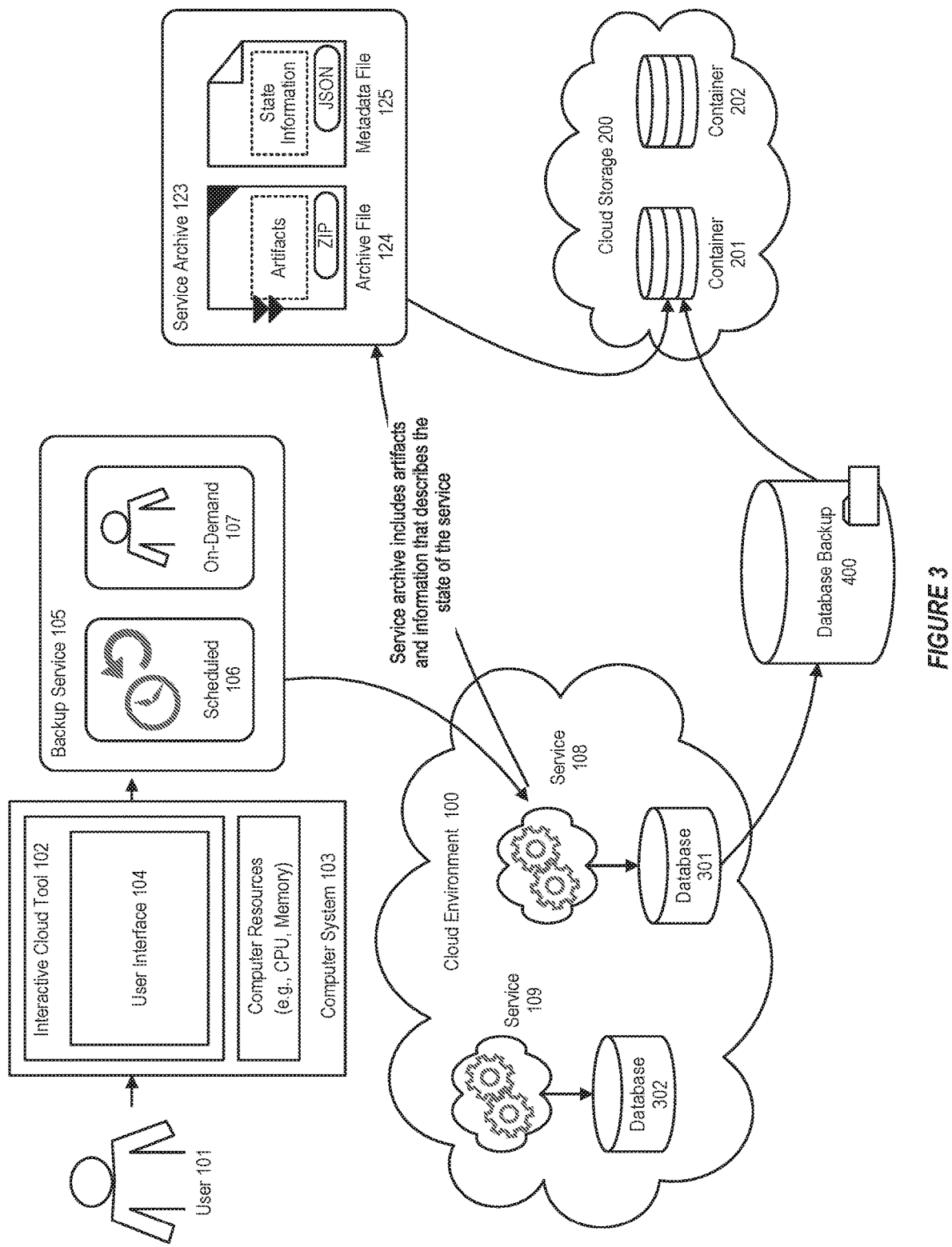
FIG. 3 further illustrates the creation of a service archive using a backup service, in accordance with an embodiment.

FIG. 3 further illustrates the creation of a service archive using a backup service, in accordance with an embodiment.

As illustrated in FIG. 3, in accordance with an embodiment, the backup process can include, for a database associated with a particular service (for example, database 301), creation of a database backup 400. The backup service can then persist or otherwise store the service archive, including the contents of the archive file and metadata file, and the database backup, for example in a container 201 on a cloud storage 200 provided by the cloud environment. Other containers 202 can be associated with other service backups.

In accordance with an embodiment, the database backup can contain, for example, Fusion Middleware component schemas, or application data for use with a service instance.

In accordance with an embodiment, the archive file can be stored in an Oracle Storage Cloud Service container. For example, the archive file can be stored in a container that was specified when the service instance was first created; or alternatively the user can determine to store the backup in a different container.

Figure 4:
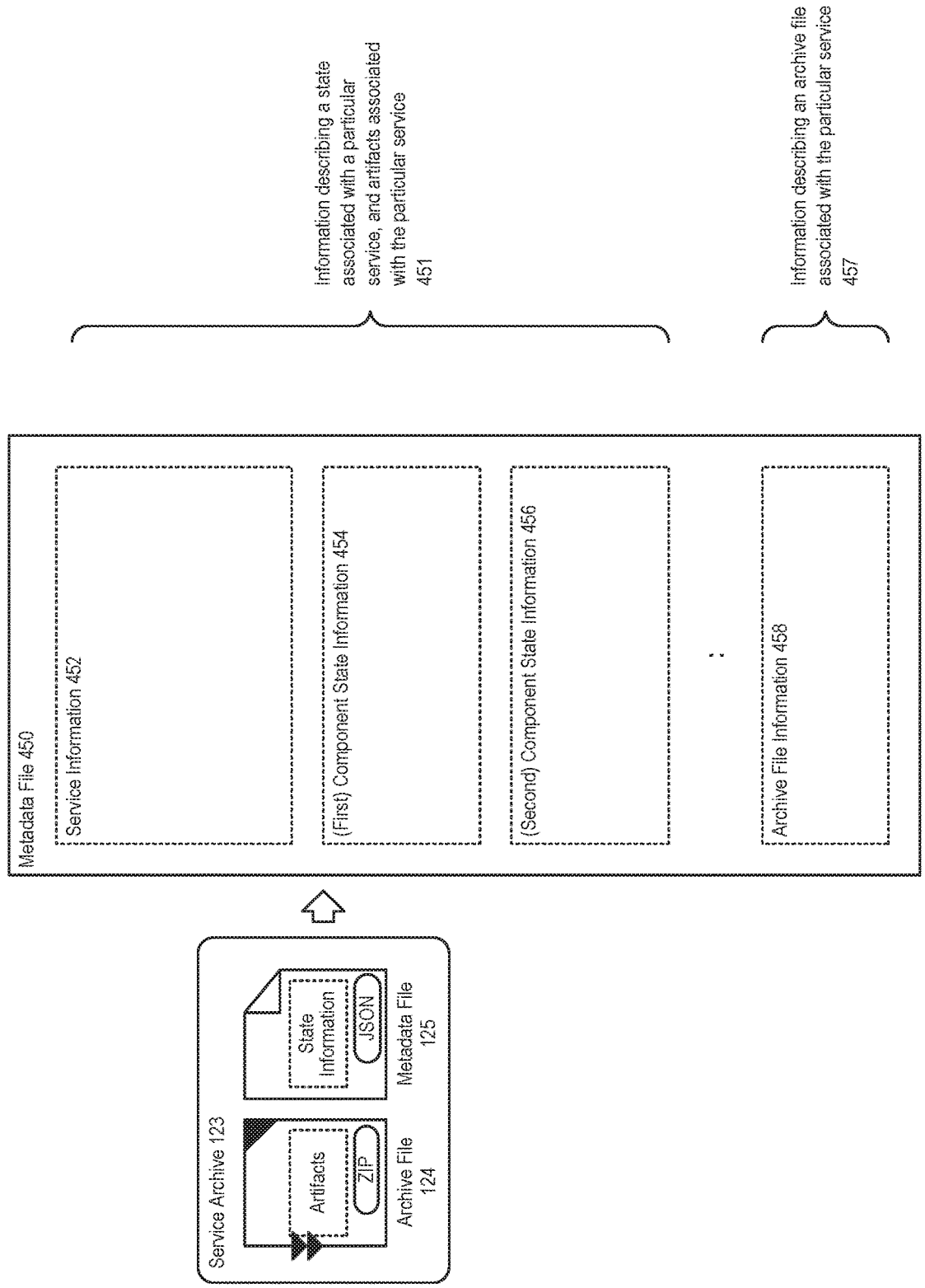
FIG. 4 illustrates an example of a metadata file, for use with a service archive, in accordance with an embodiment.

FIG. 4 illustrates an example of a metadata file, for use with a service archive, in accordance with an embodiment.

As illustrated in FIG. 4, in accordance with an embodiment, a metadata file associated with a service archive can include a data or computer-readable information describing a state associated with a particular service, and artifacts associated with the particular service 451, including, in this example, a service information 452, a (first) component state information 454, and a (second or additional) component state information 456.

In accordance with an embodiment, the metadata file associated with a service archive can also include a data or computer-readable information describing an archive file associated with the particular service 457, for example a Uniform Resource Locator (URL) or other pointer to the archive file information 458, or the archive file itself.

Service Loss

Figure 5:
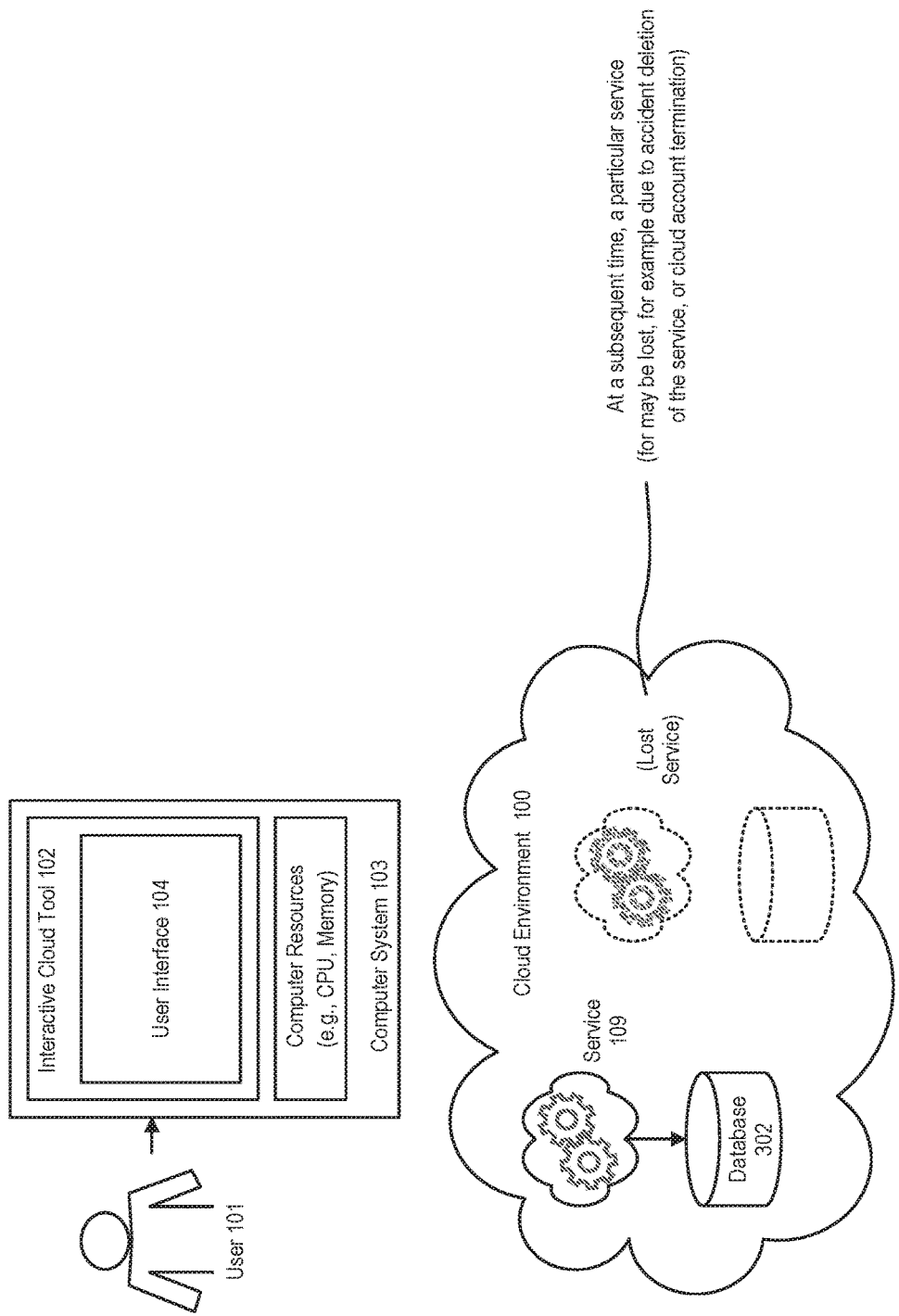
FIG. 5 illustrates the loss of a service, for example due to an accident deletion of the service or account termination, in accordance with an embodiment.

FIG. 5 illustrates the loss of a service, for example due to an accident deletion of the service or account termination, in accordance with an embodiment.

As illustrated in FIG. 5, at a point time, a particular service (in this example, service 108) that had been originally provisioned as part of a user system/environment, within the cloud environment, may be subsequently lost, for example due to accident deletion of the service, or cloud account termination. As described above, in some instances, if a service is lost, for example due to accident deletion of the service, or cloud account termination, it may be difficult to recover the lost service, and recreate the user system/environment.

Service Recovery Process

Figure 6:
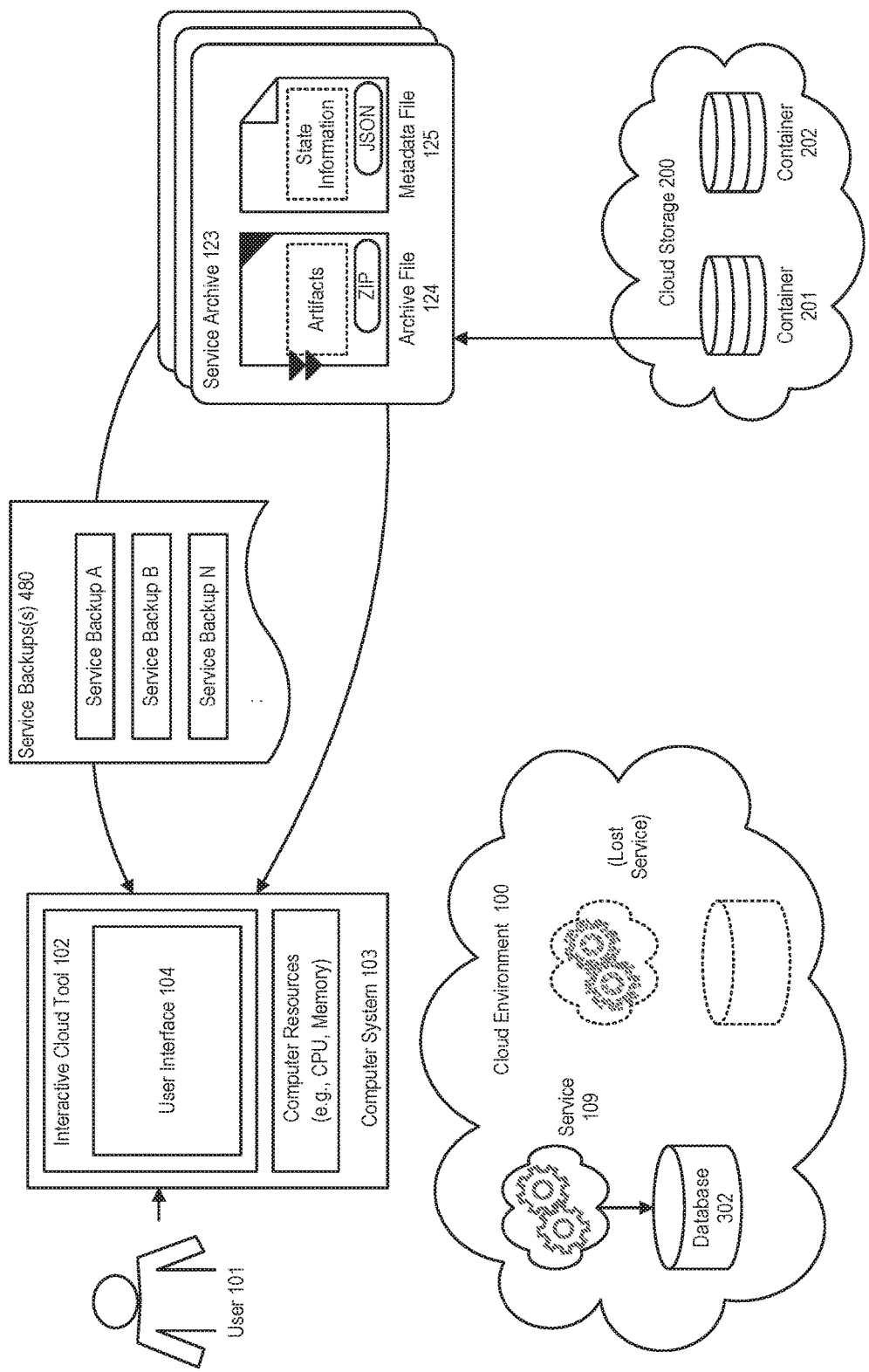
FIG. 6 illustrates the recovery and provisioning of a lost service, in accordance with an embodiment.

FIG. 6 illustrates the recovery and provisioning of a lost service, in accordance with an embodiment.

As illustrated in FIG. 6, in accordance with an embodiment, the system can provide an interactive cloud tool that enables a user to utilize to select from within a plurality of service backups 480, each of which service backups can be associated with a service archive, to provision a lost service (for example, service 108) from the storage location (for example, container 201 on cloud storage 200) where the service archive had been placed by the backup service during the backup process.

In accordance with an embodiment, generally described, the system can perform the following process to recover the lost service:

Before moving on with service provisioning, the user can elect to recover the database backup so that the service can be attached to the schema in this database.

The user enters the cloud storage credentials and location where the backup is located.

A list of all the backups present there is returned, for all the different services provisioned by the user.

The user can select the specific backup (since there can be many backups) from the list of backups, for the specific service that is to be recovered/provisioned.

The system retrieves the corresponding service archive, reads the data present in the metadata file associated with the service archive, and presents the information to the user, for confirmation to proceed.

Once the user confirms the data and settings extracted from the metadata file, with which to provision the service, the service information is stored in the database attached to the service as described above; and a user system/environment similar to that of the lost service is created. The artifacts from the archive file of the service archive are copied to this user system/environment, to reflect those which the service originally had when the selected backup was performed.

Figure 7:
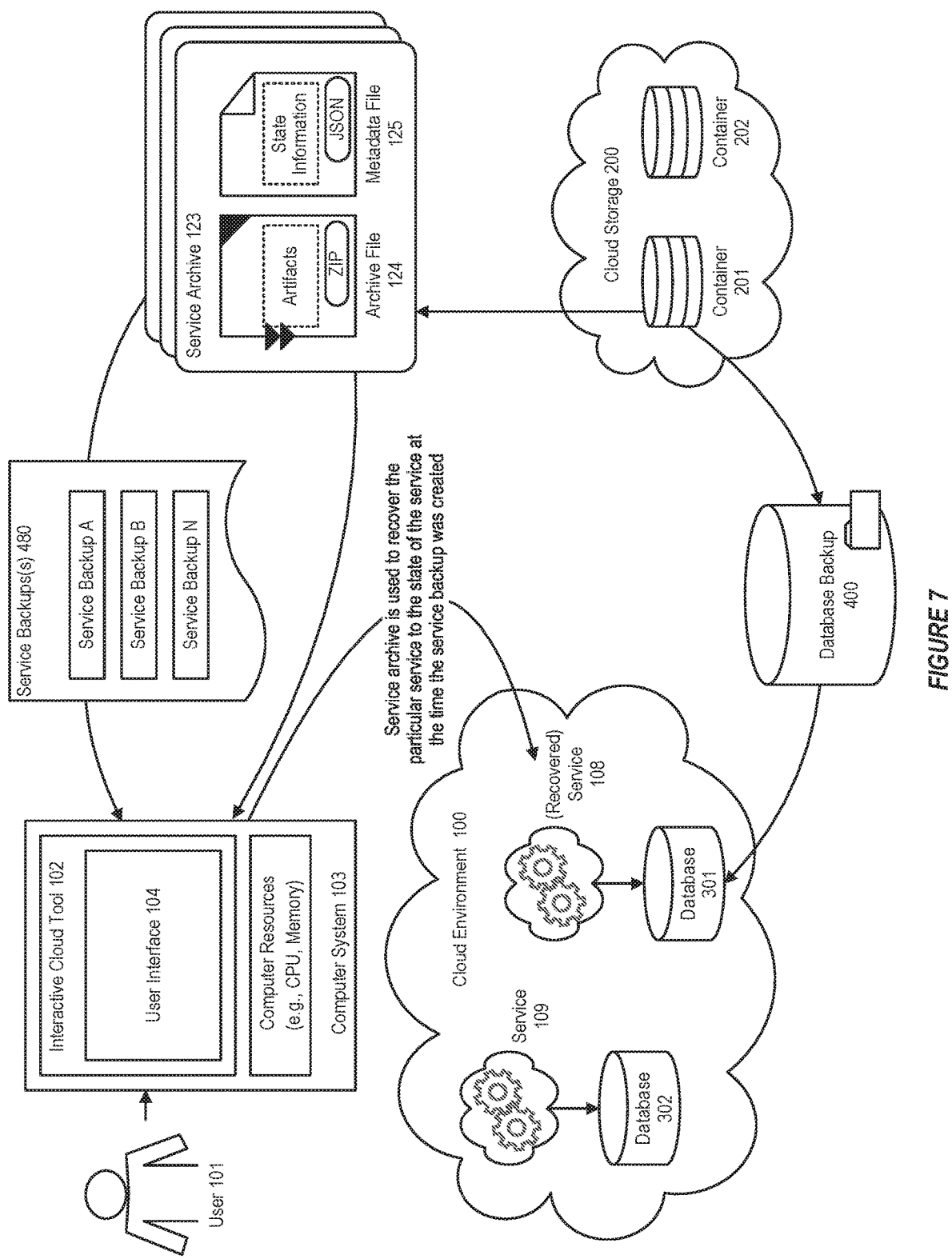
FIG. 7 further illustrates the recovery and provisioning of a lost service, in accordance with an embodiment.

FIG. 7 further illustrates the recovery and provisioning of a lost service, in accordance with an embodiment.

As illustrated in FIG. 7, in accordance with an embodiment, upon completion of the above steps, the user system/environment can once again be provided with the lost service, together with its original state as determined by the metadata file.

Example Metadata File

As described above, in accordance with an embodiment, a service archive associated with a particular service can include a metadata file including a data or computer-readable information describing a state associated with a particular service, and artifacts associated with the particular service, including a service information, a (first) component state information, and a (second or additional) component state information; and also describing an archive file associated with the particular service.

Figure 8A:
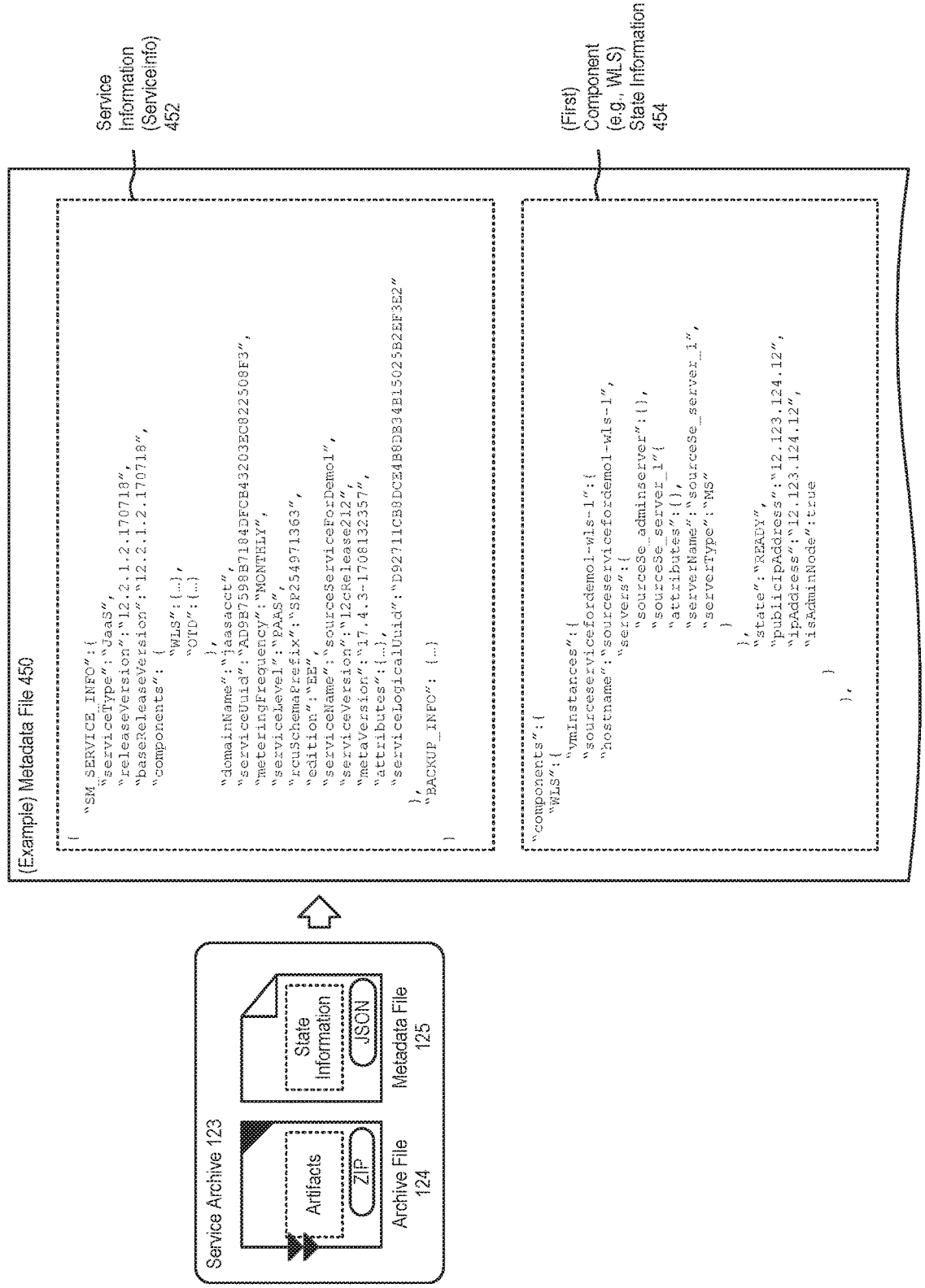
FIG. 8A illustrates an example of a metadata file, in accordance with an embodiment.

FIG. 8 illustrates an example of a metadata file, in accordance with an embodiment.

As illustrated in FIG. 8, in accordance with an embodiment, the metadata file associated with a service can include a service information, for example:

```
{
    "SM_SERVICE_INFO":{
        "serviceType":"JaaS",
        "releaseVersion":"12.2.1.2.170718",
        "baseReleaseVersion":"12.2.1.2.170718",
        "components": {
            "WLS":{...},
            "OTD":{...}
        },
        "domainName":"jaasacct",
        "serviceUuid":"AD9B7598B7184DFCB43203EC822508F3",
        "meteringFrequency":"MONTHLY",
        "serviceLevel":"PAAS",
        "rcuSchemaPrefix":"SP254971363",
        "edition":"EE",
        "serviceName":"sourceServiceForDemo1",
        "serviceVersion":"12cRelease212",
        "metaVersion":"17.4.3-1708132357",
        "attributes":{...},
        "serviceLogicalUuid":"D92711CB8DCE4B8DB34B15025B2EF3E2"
    },
    "BACKUP_INFO": {...}
}
```

As further illustrated in FIG. 8, in accordance with an embodiment, the metadata file associated with the service can also include a first component information associated with that service, in this example, a WebLogic Server component:

```
"components":{
    "WLS":{
        "vmInstances":{
            "sourceservicefordemo1-wls-1":{
                "hostname":"sourceservicefordemo1-wls-1",
                "servers":{
                    "sourceSe_adminserver":{ },
                    "sourceSe_server_1":{
                        "attributes":{ },
                        "serverName":"sourceSe_server_1",
                        "serverType":"MS"
                    }
                },
                "state":"READY",
                "publicIpAddress":"12.123.124.12",
                "ipAddress":"12.123.124.12",
                "isAdminNode":true
            }
        },
```

As further illustrated in FIG. 8, in accordance with an embodiment, the metadata file associated with the service can also include a first component information associated with that service, in this example, an Oracle Traffic Director component:

```
"OTD":{
    "componentType":"OTD",
    "attributes":{
        "SECURE_LISTENER_PORT":"8081",
        "serverCounter":"0",
        "ADMIN_USER":"weblogic",
        "LISTENER_PORT_ENABLED":"false",
        "SECURED_LISTENER_PORT":"8081",
        "ADMIN_PORT":"8089",
        "SERVICE_SECURED_LISTENER_PORT":"443",
        "PRIV_LISTENER_PORT":"80",
        "OTD_SERVER_SEC_LIST":"/OPCWLaaS/paas/JaaS/ora_otd",
        "PRIVILEGED_SECURED_LISTENER_PORT":"443",
        "SERVICE_LISTENER_PORT:"80",
        "SHAPE":"oc3",
        "PRIV_SECURE_LISTENER_PORT":"443",
        "OTD_CONFIG_NAME":"opc-config",
        "POLICY":"LEAST_CONNECTION_COUNT",
        "PRIVILEGED_LISTENER_PORT":"80",
        "ADMIN_HOST_SEC_LIST":"/OPCWLaaS/paas/JaaS/ora_otd_infraadmin",
```

As further illustrated in FIG. 8, in accordance with an embodiment, the metadata file associated with the service can also include information describing an archive file associated with the particular service, for example, a URL to a corresponding archive.zip file:

```
"BACKUP_INFO":{
    "isEncrypted": true,
    "backupURL": "https://F_15fcdd4a-cc8f/archive.zip
}
```

The above example of a metadata file and the data or computer-readable information provided and arranged therein is provided by way of example. In accordance with other embodiments, other types of data or computer-readable information, and arrangements thereof, can be provided.

Example Service Backup and Recovery Process

Figure 9:
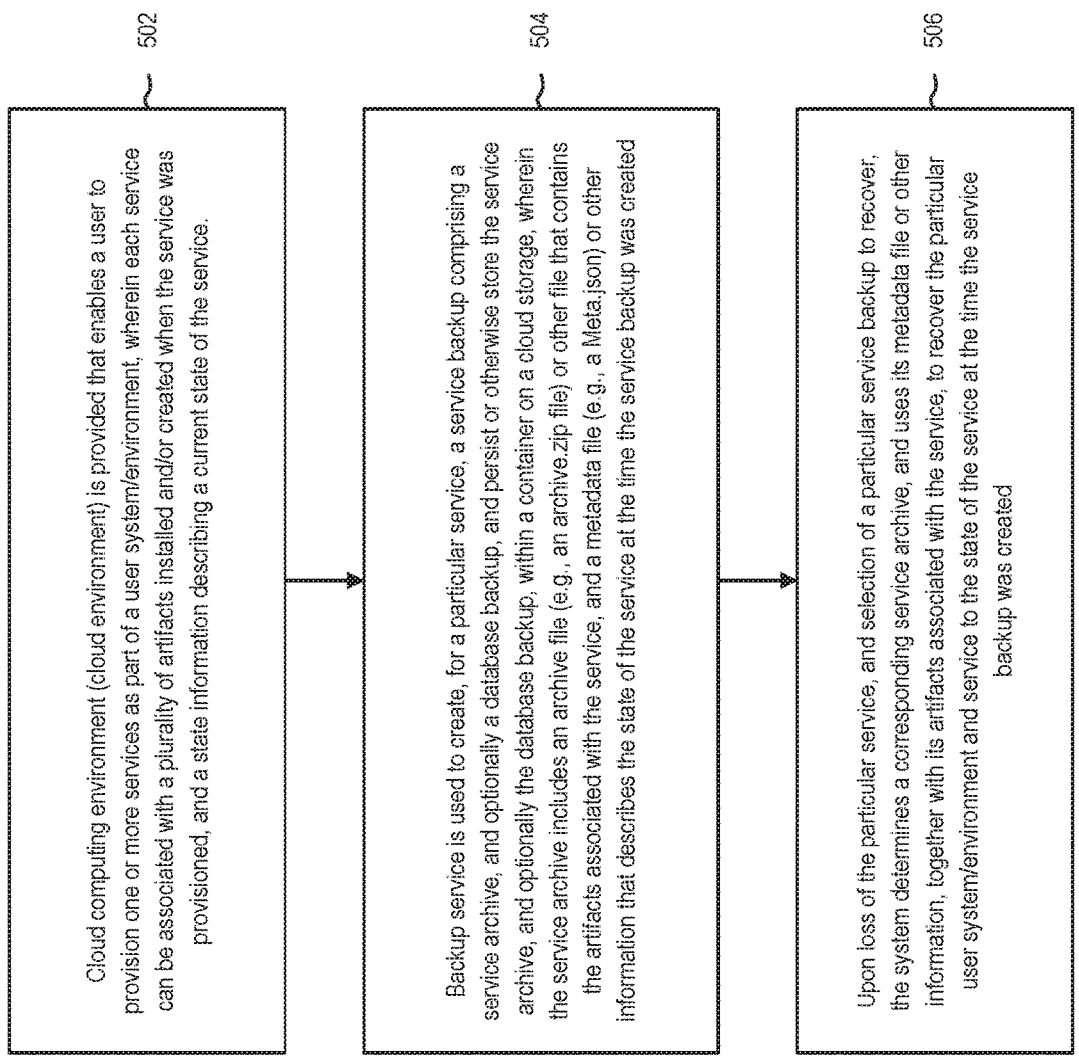
FIG. 9 illustrates a process for providing backup and recovery of a service, in accordance with an embodiment.

FIG. 9 illustrates a process for providing backup and recovery of a service, in accordance with an embodiment.

As illustrated in FIG. 9, in accordance with an embodiment, at step 502, a cloud computing environment (cloud environment) is provided that enables a user to provision one or more services as part of a user system/environment, wherein each service can be associated with a plurality of artifacts installed and/or created when the service was provisioned, and a state information describing a current state of the service.

At step 504, a backup service is used to create, for a particular service, a service backup comprising a service archive, and optionally a database backup, and persist or otherwise store the service archive, and optionally the database backup, within a container on a cloud storage, wherein the service archive includes an archive file (e.g., an archive.zip file) or other file that contains the artifacts associated with the service, and a metadata file (e.g., a Meta.json) or other information that describes the state of the service at the time the service backup was created At step 506, upon loss of the particular service, and selection of a particular service backup to recover, the system determines a corresponding service archive, and uses its metadata file or other information, together with its artifacts associated with the service, to recover the particular user system/environment and service to the state of the service at the time the service backup was created.

Figure 10:
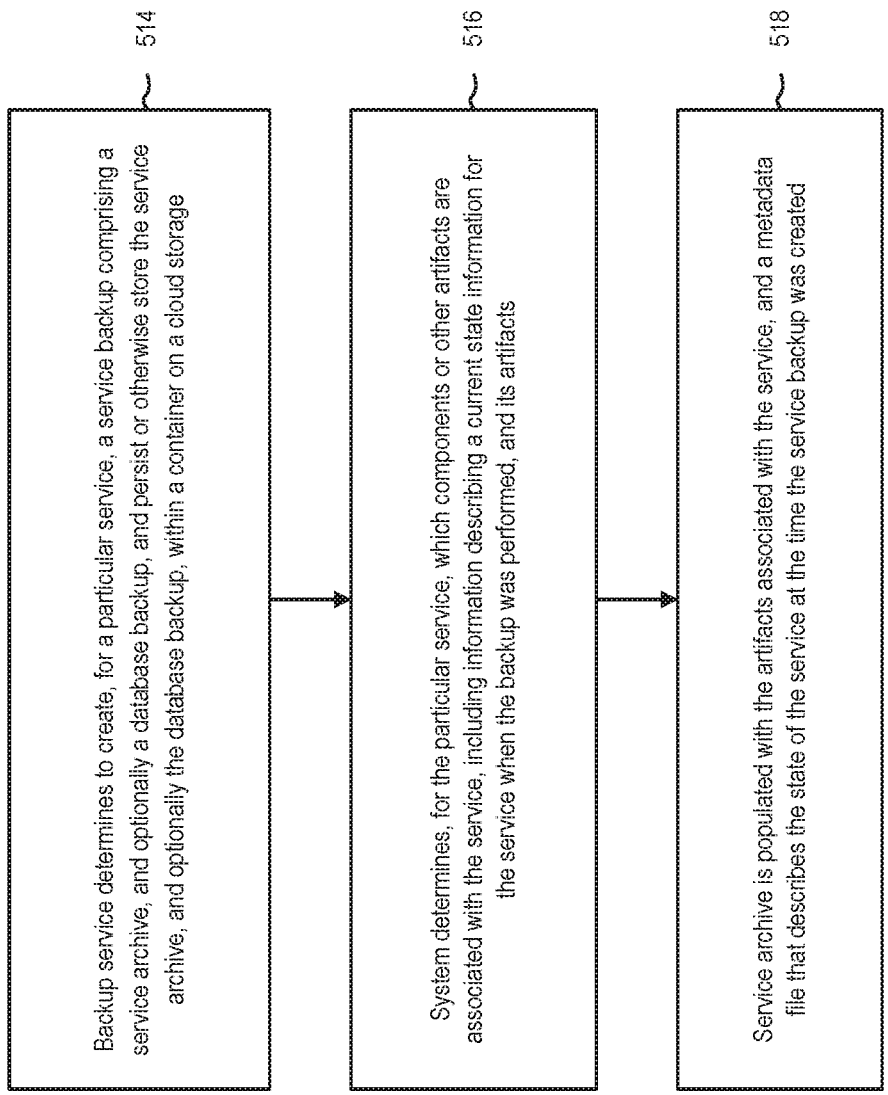
FIG. 10 further illustrates a process for providing backup of a service, in accordance with an embodiment.

FIG. 10 further illustrates a process for providing backup of a service, in accordance with an embodiment.

As illustrated in FIG. 10, in accordance with an embodiment, at step 514, a backup service determines to create, for a particular service, a service backup comprising a service archive, and optionally a database backup, and persist or otherwise store the service archive, and optionally the database backup, within a container on a cloud storage.

At step 516, the system determines, for the particular service, which components or other artifacts are associated with the service, including information describing a current state information for the service when the backup was performed, and its artifacts.

At step 518, the service archive is populated with the artifacts associated with the service, and a metadata file that describes the state of the service at the time the service backup was created.

Figure 11:
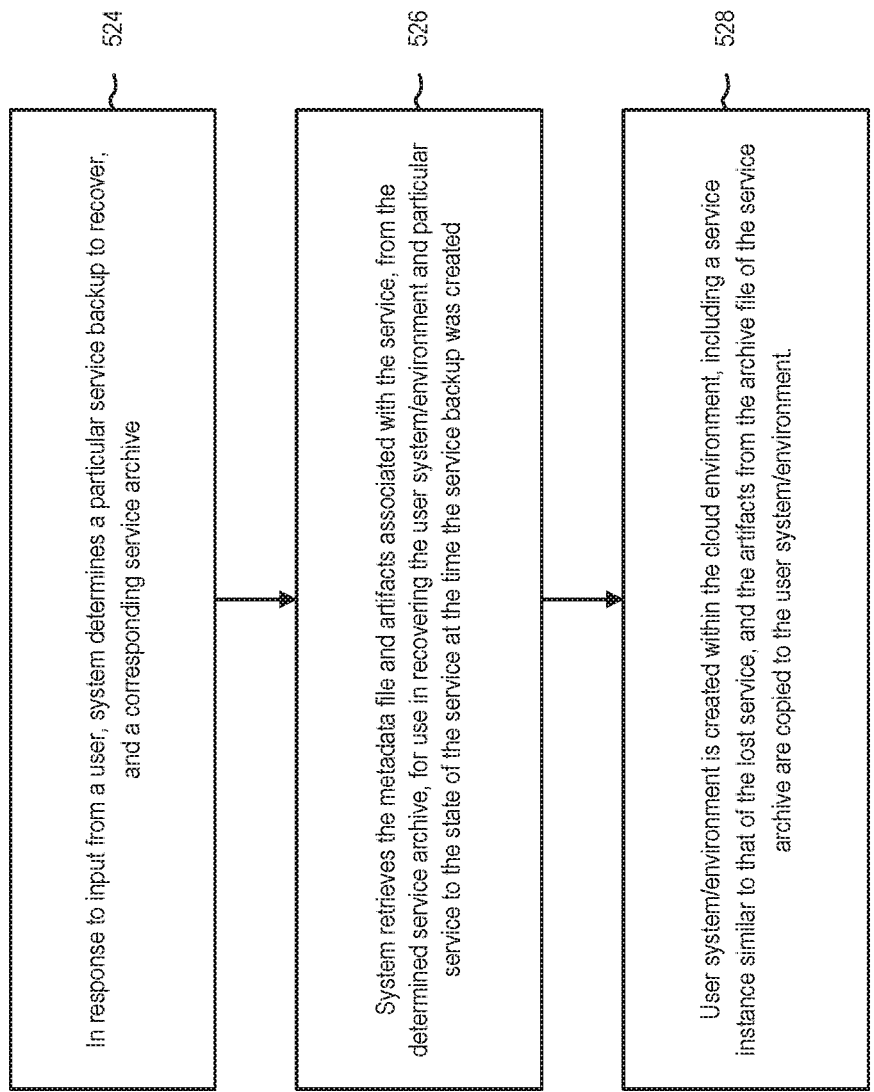
FIG. 11 further illustrates a process for providing recovery of a service, in accordance with an embodiment.

FIG. 11 further illustrates a process for providing recovery of a service, in accordance with an embodiment.

As illustrated in FIG. 11, in accordance with an embodiment, at step 524, in response to input from a user, the system determines a particular service backup to recover, and a corresponding service archive.

At step 526, the system retrieves the metadata file and artifacts associated with the service, from the determined service archive, for use in recovering the user system/environment and particular service to the state of the service at the time the service backup was created.

At step 528, a user system/environment is created within the cloud environment, including a service instance similar to that of the lost service, and the artifacts from the archive file of the service archive are copied to the user system/environment.

Example User Interface for Service Backup and Recovery

FIGS. 12 to 20 illustrate the interaction with an interactive cloud tool, including a user interface, to perform a backup and recovery of a cloud service, in accordance with an embodiment.

Figure 12:
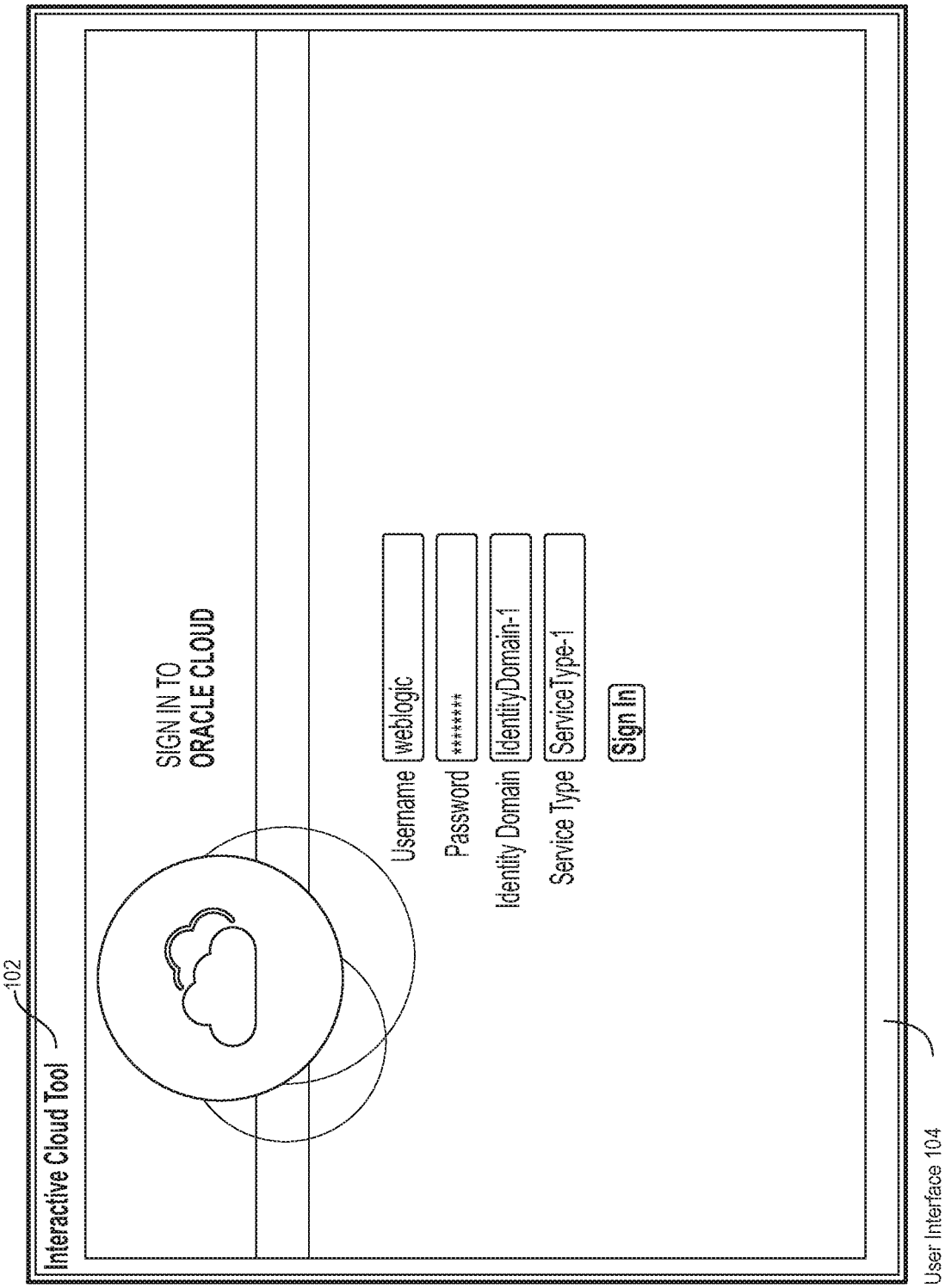
FIG. 12 illustrates a graphical user interface that enables interaction with an interactive cloud tool, to perform a backup and recovery of a cloud service, in accordance with an embodiment.

As illustrated in FIG. 12, in accordance with an embodiment, a user can login to, in this example, an Oracle PaaS Service Manager user interface.

Figure 13:
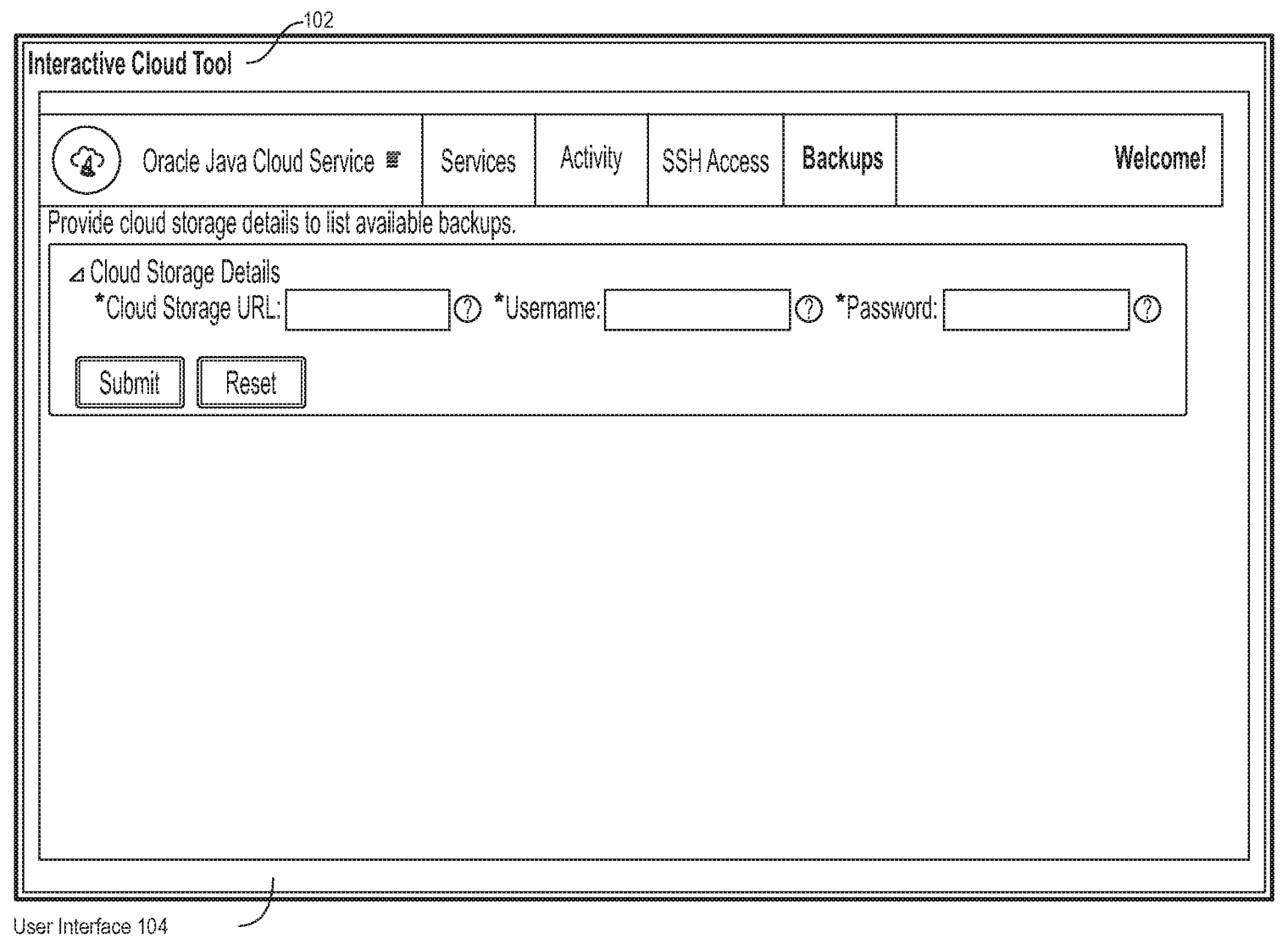

As illustrated in FIG. 13, for example, the user can switch to "Backups" tab.

Figure 14:
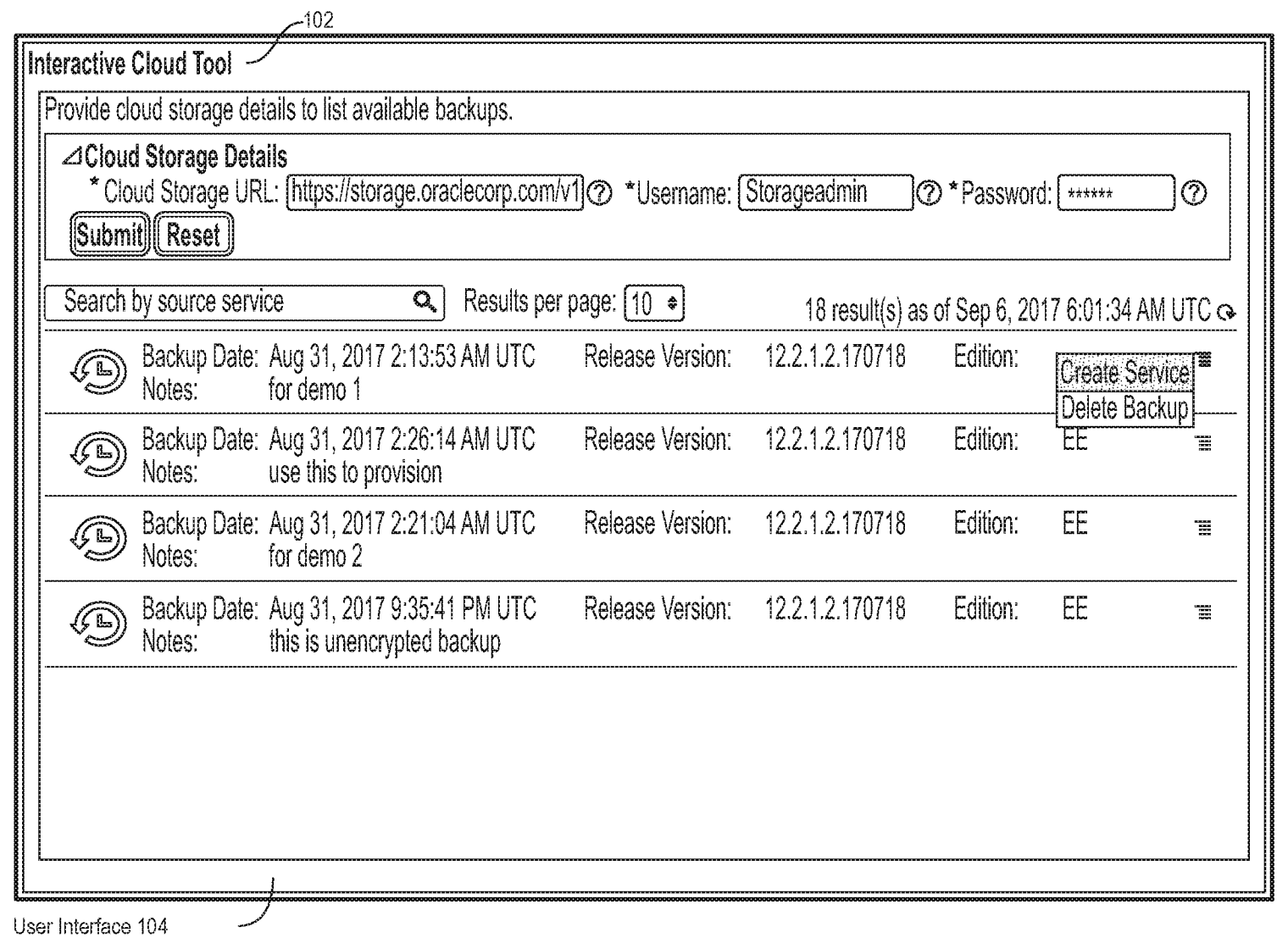

As illustrated in FIG. 14, for example, the user can enter cloud storage details and click "submit" button to list all of the backups from the specified storage location.

Figure 15:
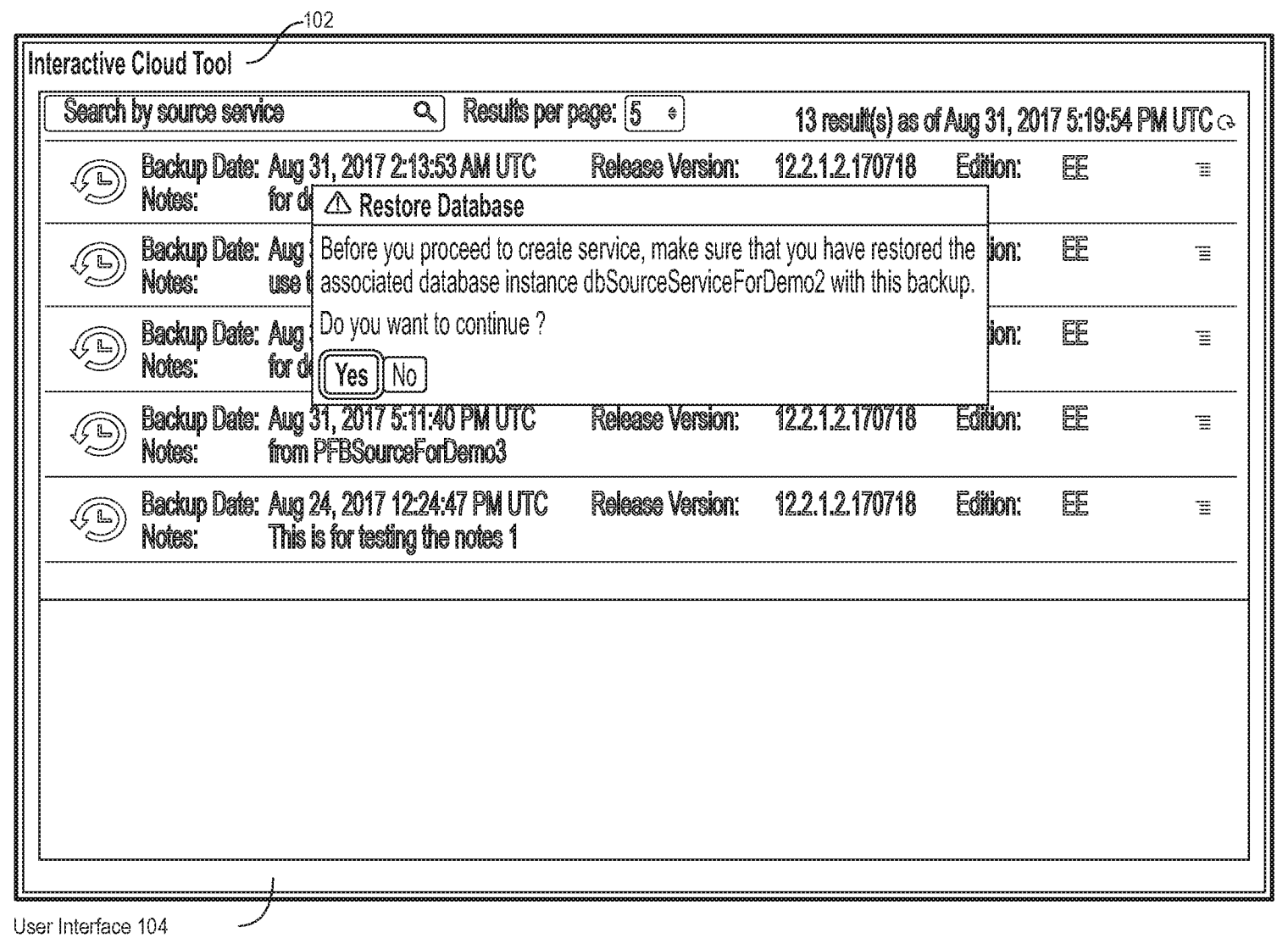

As illustrated in FIG. 15, for example, the user can select "create service" against the backup, from which they want to provision a service. This prompt will restore the associated database.

As illustrated in FIG. 16, for example, the system can display a provision pages, in which the grayed out files are fetched from backup metadata.

As illustrated in FIG. 17, for example, a user may be required to enter a password which must match the one from the source service.

Figure 18:
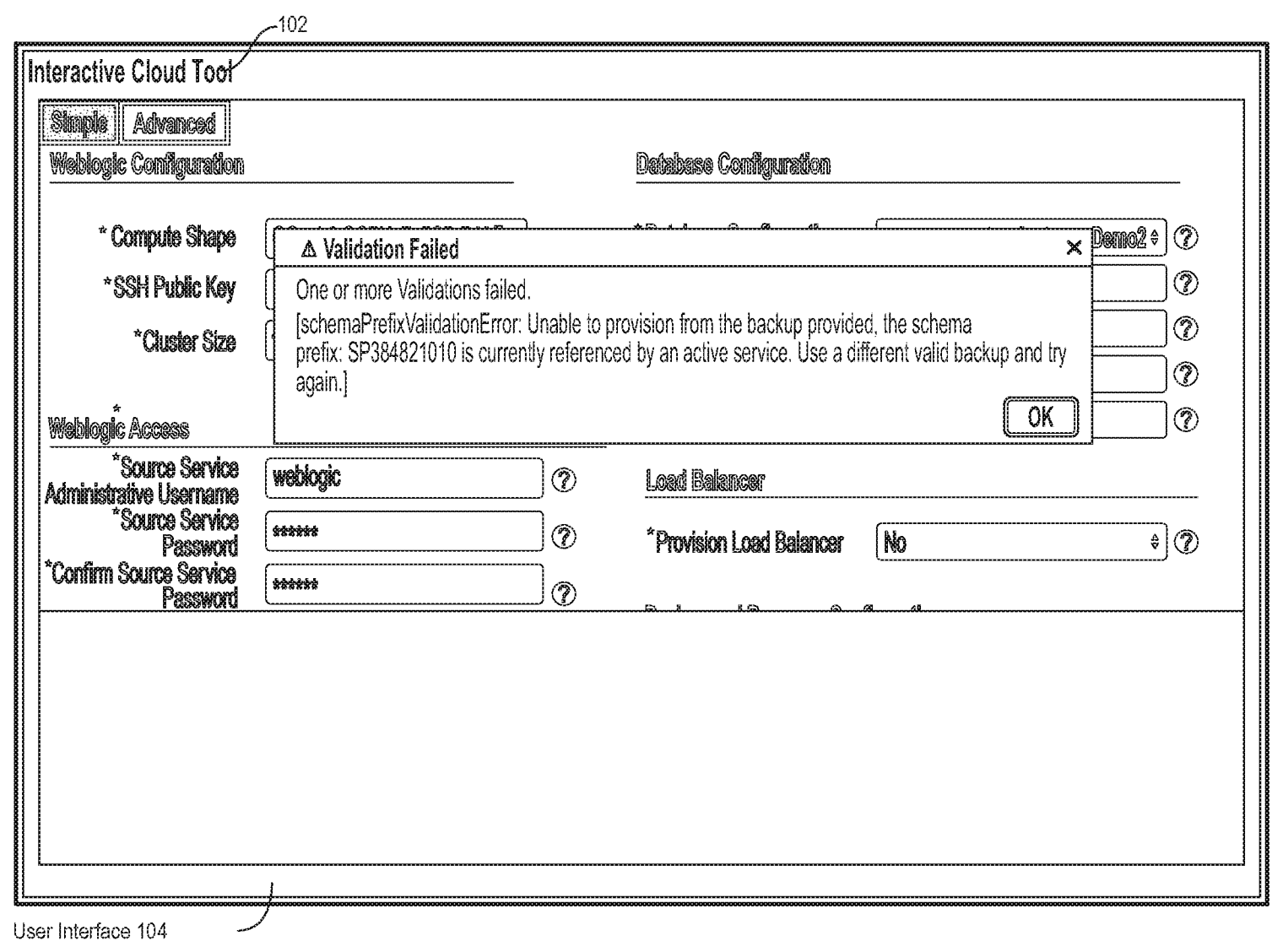

As illustrated in FIG. 18, for example, the system can perform various validation checks, such as validating that no other service is using a referenced schema from an associated database.

As illustrated in FIG. 19, for example, a confirmation page can be displayed.

As illustrated in FIG. 20, for example, a service provisioned page can be displayed.

The above examples of user interfaces and steps to perform a backup and recovery of a cloud service are provided by way of illustration. In accordance with other embodiments, other types of user interfaces and steps can be supported.

Example PaaS Cloud Service Implementation, with Java Cloud Service Recovery

In accordance with an embodiment, the above-described systems and methods for enabling backup and recovery of cloud services can be provided in an Oracle cloud or other PaaS cloud service environment which provides, for example, a Java Cloud Service. In such environments, the contents of a backup depends on whether it is an incremental backup or a full backup. If requested, a backup also includes a backup of the database.

Contents of a Full Backup

In accordance with an embodiment, a full backup contains all the runtime artifacts required to restore the service instance's configuration data. For example, a full backup contains the Oracle WebLogic Server domain configuration of the service instance, which includes:

The $DOMAIN_HOME volume of each virtual machine (/u01/data/domains). This includes any Managed Server persistent stores that are not stored in the database. WebLogic Server persistent stores are used for transaction logs and Java Message Service (JMS) providers.

Oracle WebLogic Server domain configuration files in the $MW_HOME volume of the Administration Server virtual machine (/u01/app/oracle/middleware), and Oracle Traffic Director configuration for the load balancer.

Contents of an Incremental Backup

In accordance with an embodiment, an incremental backup contains changes to configuration data on all virtual machines since the last scheduled full backup. While creating an incremental backup, the service promotes the backup to a full backup if any of the following conditions are met:

The configuration data of the service instance has been restored since the last scheduled full backup.

The service instance has been scaled out since the last scheduled full backup.

The service can now reach a virtual machine that it could not reach during the last scheduled full backup.

The last full scheduled backup is no longer available.

Contents of a Database Backup

In accordance with an embodiment, a database backup contains Oracle Fusion Middleware component schemas and application data for a service instance. By default, all scheduled automated backups of a service instance include a database backup, but the database backups can be disabled if desired.

When an on-demand backup is initiated, the option exists to keep the backup forever (it will not expire and not be deleted automatically). The extent of a database backup depends on whether the backup is to be kept forever. If the backup is to be kept forever, the database backup is a full backup. Otherwise, a Recovery Manager (RMAN) software that backs up the database determines whether the backup shall be a full backup or an incremental backup.

Incremental Backup and Related Full Backup

In accordance with an embodiment, each incremental backup is linked to the last full scheduled backup that was performed before the incremental backup. As a result, each full scheduled backup is linked to all incremental backups that were performed between that full backup and the next scheduled full backup.

A service instance can be restored from an incremental backup without the need to restore the full backup to which the incremental backup is linked. Services restore all the data from the linked full backup required for a complete restoration of the service instance. However, a full backup with linked incremental backups cannot be deleted or archived without also deleting or archiving the incremental backups.

Items that are Not Backed Up

In accordance with an embodiment, services ensures that backups contain only the information that is needed for a proper restoration of a service instance. The following items are not backed up: the operation system; the JDK binaries; the Oracle WebLogic Server and Oracle Traffic Director binaries; any new storage volumes that have been added to a node as a result of a scale up operations; any custom storage volumes that have been manually attached to a node.

How Backups are Initiated

In accordance with an embodiment, backups are initiated in several different ways. The service initiates scheduled automated backups on the following default schedule: Full backups are initiated weekly starting 12 hours after a service instance was created, rounded to the nearest five-minute interval. For example, if a service instance is created at 1:01 PM on a Monday, full backups are initiated at 1:00 AM on Tuesdays. Incremental backups are initiated every day except the day of a full backup at the same time that full backups are initiated. For example, if a service instance is created at 1:01 PM on a Monday, incremental backups are initiated at 1:00 AM every day except Tuesdays. The schedule on which automated backups are initiated can be changed. The service initiates a full backup immediately before a service instance is patched, scaled in, or scaled out.

Where Backups are Stored

In accordance with an embodiment, platform services store all backups in an Oracle Cloud Infrastructure Object Storage Classic container. To speed up restorations from recent backups, a service will also keep a local copy of any backup it has recently created.

How Backups in a Storage Container are Stored

In accordance with an embodiment, each service stores backups in the container that was specified when the service instance was created. A user can choose to store the backups in a different container. The service will automatically delete a backup when the retention period for the backup has elapsed.

How Local Copies of Backups are Stored

In accordance with an embodiment, platform services store local copies in a dedicated volume mounted on the block storage attached to the virtual machine where the Administration Server is running. A backup fails if there is insufficient free space on this volume. How long a service keeps the local copy of a backup before deleting it depends on the extent of the backup. For an incremental backup, a service keeps the local copy for seven days. For a full backup, a service keeps the local copy for as long as the local copy of its last related incremental backups is kept, or for seven days, whichever is longer.

How Backups are Deleted Automatically

In accordance with an embodiment, backups are retained for 30 days. After completing the day's scheduled backup, the Oracle Java Cloud Service a service deletes any backups or local copies that are due to be deleted that day.

What Happens During a Backup

In accordance with an embodiment, during a backup, a service instance continues to run and all applications deployed to it remain available.

To prevent configuration changes during a backup, the service locks the Oracle WebLogic Server domain if the administration server is running. After locking the domain, it backs up files on each node.

When the backup is complete, the service unlocks the Oracle WebLogic Server domain. If the backup is a scheduled backup, the service also cleans up older backups as follows: From local storage it deletes all backups old enough to be stored only in the Oracle Cloud Infrastructure Object Storage Classic container. From all storage locations it deletes any remaining copies of backups whose retention period has elapsed.

If the backup includes a database backup, the service uses Recovery Manager (RMAN) to back up the Oracle Database Cloud Service database deployment. The backup of the database is coordinated with the backup of other volumes.

What Happens when a Service Instance is Restored

In accordance with an embodiment, when restoration of a service instance is initiated, that service shuts down the servers in the service instance. After the restoration is complete, it then restarts these servers. If the backup's topology and the service instance's current topology do not match, how the service handles the mismatch depends on the scenario.

The Service Instance Contains Managed Server Nodes Not in the Backup

In accordance with an embodiment, if the service instance contains any managed server nodes that are not in the backup, the service warns that it cannot restore these nodes. An attempt can be made to scale in the service instance to delete these nodes, or the service asks for confirmation that the service instance will be scaled in automatically.

The Service Instance Contains Nodes on the Coherence Data Tier not in the Backup In accordance with an embodiment, if a service instance contains managed server nodes on the Coherence data tier that are not in the backup, the service instance can be scaled by removing the capacity unit that manages those specific nodes before trying to restore the service instance.

The Backup Contains Nodes Not in the Service Instance

In accordance with an embodiment, if the backup contains any managed server nodes that are not currently in the service instance, the service does not attempt to remove these managed servers from the Oracle WebLogic Server domain, which should be manually removed.

The Backup Contains Transaction Records

In accordance with an embodiment, a service does not automatically remove any existing Oracle WebLogic Server transaction records after restoring a service instance from a backup, which should be manually removed.

Configuring Scheduled Backups

In accordance with an embodiment, by default, backups are stored in the location specified when backups are enabled on a service instance, but this storage location can be changed. If the storage username and password that were originally specified for this service instance have changed, backups will fail until this configuration is updated.

Recovering a Deleted Service Instance from a Backup

In accordance with an embodiment, if an Oracle Java Cloud Service instance was terminated, and a backup of the service instance is available in object storage, the instance can be recreated using the backup. If backups are configured for a service instance, Oracle Java Cloud Service takes a final backup of the service instance prior to deleting it. To facilitate service recovery, the final backup of a service instance is not encrypted. Before restoring the backup, the following tasks must be performed: If the Oracle Database Cloud Service deployment that was associated with the deleted service instance was also deleted, then recreate the database deployment from the backup. Create a new Oracle Java Cloud Service instance. The following parameters must be identical to those of the deleted service instance: Service Name; Software Release; Software Edition; Local Administrative Username and Password.

In accordance with an embodiment, an Oracle Java Cloud Service REST API or CLI can be used to perform the backup restoration on the new service instance. The request body must specify the value recover for the restoreType parameter; the URL of the backup file in cloud storage using the archiveURI parameter; and the credentials for the Oracle Database Cloud Service deployment and for Oracle WebLogic Server, for example:

```
{
"archiveURI": "https://acme.storage.oraclecloud.com/v1/MyService-acme/MyContainer/MyBackup.zip",
```

-continued

```
"dbaPassword": "My_DB_Password", "dbaUser": "mydbausername",
"originalWLSAdminPassword": "My_WLS_Password",
"originalWLSAdminUser": "myadminuser",
"restoreType": "recover"
}
```

If the backup is encrypted (it is not the final backup), then the original EncryptionPassword parameter must also be include, for example:

```
{
"archiveURI": "https://acme.storage.oraclecloud.com/v1/MyService-acme/
MyContainer/MyEncryptedBackup.zip",
"dbaPassword": "My_DB_Password", "dbaUser": "mydbausername",
"originalEncryptionPassword": "My_Original_Backup_Password",
"originalWLSAdminPassword": "My_WLS_Password",
"originalWLSAdminUser": "myadminuser",
"restoreType": "recover"
}
```

After successfully recovering the service instance, the new service instance can be scaled out so that it has the same number of managed servers as the original service instance.

The present invention may be conveniently implemented using one or more conventional general purpose or specialized computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory computer readable storage medium (media) having instructions stored thereon/in which can be used to program a computer to perform any of the processes of the present invention. Examples of storage mediums can include, but are not limited to, floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or other types of storage media or devices suitable for non-transitory storage of instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art.

For example, although several of the above examples illustrate the backup and recovery of services in an Oracle cloud environment, and the use of zip files and Meta.json files, in accordance with various embodiments, other types of archive files and metadata files can be used, and the techniques described herein can be use with other types of cloud computing environments (cloud environments), or other types of cloud services.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A method for providing backup and recovery of a plurality of cloud services in a cloud computing environment, the method comprising:
   providing a backup service in the cloud computing environment;
   operating the backup service to create a separate cloud service archive for each of the plurality of cloud services operating in the cloud computing environment;
   wherein each separate cloud service archive comprises an archive file that contains one or more artifacts that were installed and/or created when said each cloud service was provisioned including runtime artifacts required to restore the cloud service, and a metadata file that contains current state information about said each service when the backup was performed;
   wherein the runtime artifacts in the archive file include configuration of a home volume of one or more virtual machines associated with said each cloud service, configuration of managed server persistent stores associated with said each cloud service, and configuration of a traffic director configuration associated with said each cloud service;
   using the backup service to persist the each separate cloud service archive within a separate container in a cloud storage system, for use in recovering said each cloud service;
   performing database backup for a database associated with said each cloud service; and
   persisting said database backup for said each cloud service in said separate container in the cloud storage system with said cloud service archive for said each cloud service.

2. The method of claim 1, further comprising:
   providing an interactive cloud tool that provides one or more user interfaces to enable backup and recovery of each of the plurality of cloud services;
   receiving at said interactive tool from a user a selection of a particular cloud service of the plurality of cloud service to be recovered; and
   recovering the particular cloud service of the plurality of cloud services from the cloud storage system to the cloud service environment using the cloud service archive for said particular cloud service persisted within the container in the cloud storage system.

3. The method of claim 1, wherein the archive file is a zip file.

4. The method of claim 1, further comprising:
   recovering a particular cloud service of the plurality of cloud service from the cloud storage system to the cloud service environment using the cloud service archive for said particular cloud service persisted within the container in the cloud storage system.

5. The method of claim 1, further comprising providing an interactive cloud tool that provides one or more user interfaces to enable backup and recovery of each of the plurality of cloud services.

6. A non-transitory computer readable storage medium, including instructions stored thereon for supporting backup and recovery of cloud services in a cloud computing environment, which instructions, when read and executed by one or more computers cause the one or more computers to perform steps comprising:

providing a backup service in the cloud computing environment;
operating the backup service to create a separate cloud service archive for each of the plurality of cloud services operating in the cloud computing environment;
wherein each separate cloud service archive comprises an archive file that contains one or more artifacts that were installed and/or created when said each cloud service was provisioned including runtime artifacts required to restore the cloud service, and a metadata file that contains current state information about said each service when the backup was performed;
wherein the runtime artifacts in the archive file include configuration of home volume of one or more virtual machines associated with said each cloud service, configuration of managed server persistent stores associated with said each cloud service, and configuration of a traffic director configuration associated with said each cloud service;
using the backup service to persist each separate cloud service archive within a separate container in a cloud storage system, for use in recovering said each cloud service;
performing database backup for a database associated with said each cloud service; and
persisting said database backup for said each cloud service in said separate container in the cloud storage system with said cloud service archive for said each cloud service.

7. The non-transitory computer readable storage medium of claim 6, wherein the steps further comprise:
providing an interactive cloud tool that provides one or more user interfaces to enable backup and recovery of each of the plurality of cloud services;
receiving at said interactive tool from a user a selection of a particular cloud service of the plurality of cloud service to be recovered; and
recovering the particular cloud service of the plurality of cloud services from the cloud storage system to the cloud service environment using the cloud service archive for said particular cloud service persisted within the container in the cloud storage system.

8. The non-transitory computer readable storage medium of claim 6, wherein the archive file is a zip file.

9. The non-transitory computer readable storage medium of claim 6, wherein the steps further comprise:
recovering a particular cloud service of the plurality of cloud services from the cloud storage system to the cloud service environment using the cloud service archive persisted within the container in the cloud storage system and associated with said particular cloud service.

10. The non-transitory computer readable storage medium of claim 6, further comprising providing an interactive cloud tool that provides one or more user interfaces to enable backup and recovery of the cloud service.

11. A system for providing backup and recovery of a plurality of cloud services in a cloud computing environment, the system comprising:
a backup system operating on a computer system in the cloud computing environment;
a cloud storage system accessible to the backup system;
wherein the backup system provides a backup service configured to create a separate cloud service archive for each of the plurality of cloud services operating in the cloud computing environment;
wherein the cloud service archive comprises an archive file that contains one or more artifacts that were installed and/or created when said each cloud service was provisioned including runtime artifacts required to restore the cloud service, and a metadata file that contains current state information about said each cloud service when the backup was performed; and
wherein the runtime artifacts in the archive file include configuration of a home volume of one or more virtual machines associated with said each cloud service, configuration of managed server persistent stores associated with said each cloud service, and configuration of a traffic director configuration associated with said each cloud service;
wherein the backup service is configured to persist each separate cloud service archive within a separate container in the cloud storage system, for use in recovering said each cloud service;
wherein the backup service is configured to perform database backup for a database associated with said each cloud service and persist said database backup in said separate container in the cloud storage system with said cloud service archive for said each cloud service.

12. The system of claim 11, further configured to provide an interactive cloud tool that provides one or more user interfaces to enable backup and recovery of the cloud service;
wherein the interactive cloud tool enables a user to select a particular cloud service of the plurality of service for recovery; and
recover the particular cloud service of the plurality of cloud services from the cloud storage system to the cloud service environment using the cloud service archive persisted within the container in the cloud storage system and associated with said particular cloud service.

13. The system of claim 11, wherein the archive file is a zip file.

14. The system of claim 11, further configured to:
recover a particular cloud service of the plurality of cloud services from the cloud storage system to the cloud service environment using the cloud service archive persisted within the container in the cloud storage system and associated with said particular cloud service.

15. The system of claim 11, further configured to provide an interactive cloud tool that provides one or more user interfaces to enable backup and recovery of the cloud service.

* * * * *

UNITED STATES PATENT AND TRADEMARK OFFICE
CERTIFICATE OF CORRECTION

| | |
|---|---|
| PATENT NO. | : 11,327,846 B2 |
| APPLICATION NO. | : 16/144488 |
| DATED | : May 10, 2022 |
| INVENTOR(S) | : Kumar et al. |

It is certified that error appears in the above-identified patent and that said Letters Patent is hereby corrected as shown below:

On the Title Page

On page 2, Column 2, item (56) under Other Publications, Line 11, delete "Rsunc," and insert -- Rsync, --, therefor.

On page 2, Column 2, item (56) under Other Publications, Line 13, delete "byarchive.org" and insert -- by archive.org --, therefor.

On page 2, Column 2, item (56) under Other Publications, Line 16, delete "definiton" and insert -- definition --, therefor.

In the Specification

In Column 8, Line 22, delete "created" and insert -- created. --, therefor.

In the Claims

In Column 14, Line 28, in Claim 1, delete "the each" and insert -- each --, therefor.

In Column 15, Line 15, in Claim 6, delete "of home" and insert -- of a home --, therefor.

Signed and Sealed this
Sixteenth Day of August, 2022

Katherine Kelly Vidal
*Director of the United States Patent and Trademark Office*